(12) United States Patent
Clement et al.

(10) Patent No.: US 11,535,982 B2
(45) Date of Patent: Dec. 27, 2022

(54) MULTI-STRAND CABLE WITH TWO LAYERS HAVING IMPROVED PENETRABILITY

(71) Applicant: COMPAGNIE GENERALE DES ETABLISSEMENTS MICHELIN, Clermont-Ferrand (FR)

(72) Inventors: Emmanuel Clement, Clermont-Ferrand (FR); Marianna Chevalley, Clermont-Ferrand (FR); Alexandre Gianetti, Clermont-Ferrand (FR); Stéphane Laurent, Clermont-Ferrand (FR); Rémi Pinaut, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 752 days.

(21) Appl. No.: 16/470,477

(22) PCT Filed: Dec. 20, 2017

(86) PCT No.: PCT/FR2017/053714
§ 371 (c)(1),
(2) Date: Jun. 17, 2019

(87) PCT Pub. No.: WO2018/115727
PCT Pub. Date: Jun. 28, 2018

(65) Prior Publication Data
US 2020/0115850 A1    Apr. 16, 2020

(30) Foreign Application Priority Data
Dec. 20, 2016 (FR) ..................... 1662936

(51) Int. Cl.
*D07B 1/06* (2006.01)
*B60C 9/00* (2006.01)

(52) U.S. Cl.
CPC .......... *D07B 1/0613* (2013.01); *B60C 9/0007* (2013.01); *D07B 1/0633* (2013.01);
(Continued)

(58) Field of Classification Search
CPC ............... D07B 1/0613; D07B 1/0633; D07B 2201/1048; D07B 2201/1076;
(Continued)

(56) References Cited

U.S. PATENT DOCUMENTS

| 4,265,291 A | 5/1981 | Pommier |
| 4,274,464 A | 6/1981 | Pommier |

(Continued)

FOREIGN PATENT DOCUMENTS

| CN | 203373487 U | 1/2014 |
| EP | 0 383 716 A1 | 8/1990 |

(Continued)

OTHER PUBLICATIONS

G.H. Wolf, et al., "Effect of Cord Construction on the Rubber-to-Steel Adhesion" (Der Einfluss Der Cordkonstruktion Auf Die Haftung Gummi/Stahl), Kautschuk und Gummi, Kunststoffe, 34 (5), pp. 365-370 (1981) (with English abstract and concise explanation).
Copending U.S. Appl. No. 16/470,486, filed Dec. 20, 2017.
International Search Report dated Apr. 3, 2018, in corresponding PCT/FR2017/053714 (6 pages).

*Primary Examiner* — Shaun R Hurley
(74) *Attorney, Agent, or Firm* — Venable LLP

(57) ABSTRACT

A cord (50) comprises: an internal strand (TI) comprising an internal layer (C1), and an external layer (C3); and L>1 external strands (TE) comprising an internal layer (C1') of Q'=1 internal wire (F1'), an intermediate layer (C2') of M' intermediate wires (F2') wound around the internal layer (C1') with a pitch p2', and an external layer (C3') of N'
(Continued)

external wires (F3') wound around the intermediate layer (C2') with a pitch p3'. The external layer (CE) of the cord is wound around the internal layer (CI) of the cord in a direction of winding of the cord (50). Each external layer (C3, C3') of each internal and external strand (TI, TE) is wound in the same direction of winding that is the opposite to the direction of winding of the cord (50). The external layer (CE) of the cord (50) is desaturated, and $0.36 \leq (p3'-p2')/p3' \leq 0.57$.

20 Claims, 12 Drawing Sheets

(52) U.S. Cl.
CPC .......... B60C 2009/0092 (2013.01); D07B 2201/1048 (2013.01); D07B 2201/1076 (2013.01); D07B 2201/202 (2013.01); D07B 2201/203 (2013.01); D07B 2201/2006 (2013.01); D07B 2201/2025 (2013.01); D07B 2201/2029 (2013.01); D07B 2201/2031 (2013.01); D07B 2201/2051 (2013.01); D07B 2201/2061 (2013.01); D07B 2401/208 (2013.01); D07B 2501/2046 (2013.01)

(58) Field of Classification Search
CPC ...... D07B 2201/2006; D07B 2201/202; D07B 2201/2025; D07B 2201/2029; D07B 2201/203; D07B 2201/2031; D07B 2201/2051; D07B 2201/2061; D07B 2401/208; D07B 2501/2046; B60C 9/0007; B60C 2009/0092
See application file for complete search history.

(56) References Cited

U.S. PATENT DOCUMENTS

| | | | |
|---|---|---|---|
| 4,947,636 A | | 8/1990 | Sinopoli |
| 5,269,128 A | * | 12/1993 | Walton ................. G02B 6/4434 |
| | | | 57/220 |
| 5,461,850 A | * | 10/1995 | Bruyneel ............. D07B 1/0613 |
| | | | 57/902 |
| 6,272,830 B1 | | 8/2001 | Morgan et al. |
| 7,137,483 B2 | | 11/2006 | Kato et al. |
| 2007/0130905 A1 | * | 6/2007 | Kish ....................... D02G 3/48 |
| | | | 57/902 |
| 2007/0131331 A1 | * | 6/2007 | Neubauer ............ D07B 1/0613 |
| | | | 152/527 |
| 2010/0170215 A1 | * | 7/2010 | Nishimura ............. D07B 1/165 |
| | | | 57/362 |
| 2011/0209808 A1 | | 9/2011 | Nakamura |
| 2012/0125512 A1 | | 5/2012 | Pottier et al. |
| 2015/0075689 A1 | * | 3/2015 | Fukuda ................. B60C 9/0007 |
| | | | 57/237 |
| 2015/0136295 A1 | | 5/2015 | Barguet et al. |
| 2015/0159325 A1 | | 6/2015 | Barguet et al. |
| 2015/0184336 A1 | * | 7/2015 | Chuang ............... E05B 73/0005 |
| | | | 361/679.56 |
| 2015/0329995 A1 | | 11/2015 | Clement et al. |
| 2018/0010294 A1 | | 1/2018 | Pironneau et al. |

FOREIGN PATENT DOCUMENTS

| | | | | |
|---|---|---|---|---|
| EP | 1 126 073 A2 | | 8/2001 | |
| FR | 2419181 A1 | | 10/1979 | |
| FR | 2419182 A1 | | 10/1979 | |
| FR | 3014914 A1 | * | 6/2015 | .......... D07B 1/0613 |
| JP | 2005-314833 A | | 11/2005 | |
| WO | 2010/054790 A1 | | 5/2010 | |
| WO | 2015/090920 A1 | | 6/2015 | |

* cited by examiner

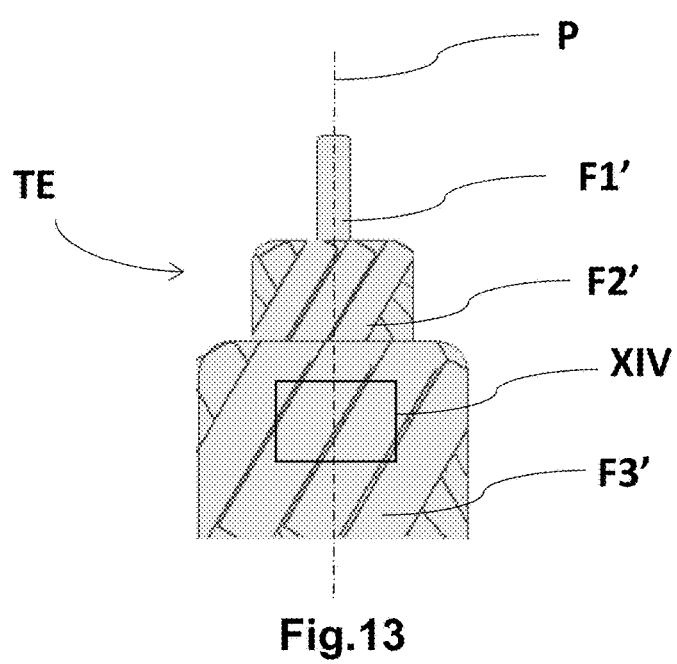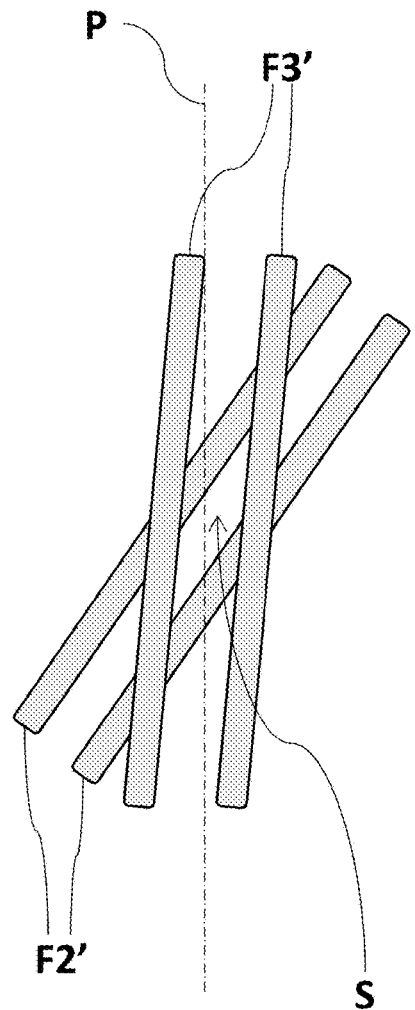
Fig.13
Fig.14 though at the present time, this type of cord is known particularly for the following technical fields: working, protective, carcass and bead wire ply reinforcement for tyres;
MULTI-STRAND CABLE WITH TWO LAYERS HAVING IMPROVED PENETRABILITY

BACKGROUND

The invention relates to multi-strand cords that can be used notably for reinforcing tyres, particularly tyres for heavy industrial vehicles.

A tyre having a radial carcass reinforcement comprises a tread, two inextensible beads, two sidewalls connecting the beads to the tread and a belt, or crown reinforcement, arranged circumferentially between the carcass reinforcement and the tread. This crown reinforcement comprises a plurality of plies made of elastomer compound, possibly reinforced with reinforcing elements such as cords or monofilaments, of the metal or textile type.

The crown reinforcement generally comprises at least two superposed crown plies, sometimes referred to as working plies or crossed plies, the, generally metal, reinforcing elements of which are placed virtually parallel to one another within a ply but crossed from one ply to the other, that is to say inclined, symmetrically or asymmetrically, with respect to the median circumferential plane, by an angle which is generally comprised between 10° and 45°. The working plies generally comprise reinforcing elements that exhibit very low elongation so as to perform their function of guiding the tyre.

The crown reinforcement may also comprise various other auxiliary plies or layers of elastomer compound, with widths that may vary as the case may be, and which may or may not contain reinforcing elements. Mention may be made by way of example of what are known as protective plies which have the role of protecting the remainder of the belt from external attack or perforations, or also of what are known as hooping plies which contain reinforcing elements that are oriented substantially in the circumferential direction (what are known as "zero-degree" plies), whether these be radially on the outside or on the inside with respect to the working plies. The protective plies generally comprise reinforcing elements that exhibit a high elongation so that they deform under the effect of a stress applied by an indenter, for example a rock.

A working ply reinforcement element comprising a two-layer multi-strand metal cord as disclosed in the examples of WO2015/090920 is known from the prior art. This cord comprises an internal layer of the cord made up of an internal strand and an external layer of the cord made up of six external strands wrapped in a helix around the internal layer of the cord.

Each internal and external strand comprises an internal layer of the strand which layer is made up of a single internal wire, an intermediate layer made up of six wires and an external layer of the strand which layer is made up of eleven external wires. The intermediate and external layers of the internal strand are wound in the S-direction around the internal and intermediate layers of the internal strand respectively. The intermediate and external layers of each external strand are wound in the Z-direction around the internal and intermediate layers of each external strand respectively. The external strands are wound in a helix around the internal strand in a direction of winding of the cord, this direction being the S-direction. Each pitch p2, p2' of the intermediate layers of each internal and external strand is equal to 14 mm, and each pitch p3, p3' of the external layer of each internal and external strand is equal to 20 mm.

A tyre of a heavy industrial vehicle, notably of construction plant type, is subjected to numerous attacks. Specifically, this type of tyre usually runs on an uneven road surface, sometimes resulting in perforations of the tread. These perforations allow the entry of corrosive agents, for example air and water, which oxidize the metal reinforcing elements of the crown reinforcement, in particular of the crown plies, and considerably reduce the life of the tyre.

One solution for increasing the life of the tyre is to combat the spread of these corrosive agents. Provision may thus be made to cover each internal and intermediate layer with an elastomer compound during the manufacture of the cord. During this process, the elastomer compound present penetrates the capillaries that are present between each layer of each strand and thus prevents the corrosive agents from spreading. Such cords, generally referred to as cords rubberized in situ, are well known from the prior art.

Another solution for increasing the life of the tyre is to increase the cord's force at break. In general, the force at break is increased by increasing the diameter of the wires that make up the cord and/or by increasing the number of wires and/or the individual strength of each wire. However, increasing the diameter of the wires still further, for example beyond 0.50 mm, of necessity leads to a lowering of the flexibility of the cord, and this is not desirable. Increasing the number of wires usually leads to a lowering of the ability of the elastomer compound to penetrate the strands. Finally, increasing the individual strength of each wire entails significant investment in the installations used to manufacture the wires.

The object of the invention is a cord exhibiting improved penetrability of its external strands and better accessibility by the elastomer compound to the internal strand as compared with the cord of the prior art, thus making it possible to reduce the ingress and spread of corrosive agents into and along the cord.

SUMMARY

Cord According to the Invention

To this end, one subject of the invention is a two-layer multi-strand cord comprising:
  an internal layer of the cord made up of an internal strand having at least two layers comprising:
    an internal layer made up of Q internal wire(s) and
    an external layer made up of N' external wires wound around the internal layer,
  an external layer of the cord made up of L>1 external strands having three layers comprising:
    an internal layer made up of Q'=1 internal wire,
    an intermediate layer made up of M' intermediate wires wound around the internal layer with a pitch p2', and
    an external layer made up of N' external wires wound around the intermediate layer with a pitch p3',
  in which:
    the external layer of the cord is wound around the internal layer of the cord in a direction of winding of the cord;
    each external layer of each internal and external strand is wound respectively around the internal and intermediate layer of each internal and external strand respectively in the same direction of winding that is the opposite to the direction of winding of the cord;
    the external layer of the cord is desaturated, and
    the pitches p2' and p3' satisfy $0.36 \leq (p3'-p2')/p3' \leq 0.57$.

It will be recalled that, as is known, the pitch of a strand represents the length of this strand, measured parallel to the axis of the cord, after which the strand that has this pitch has made a complete turn around the said axis of the cord. Similarly, the pitch of a wire represents the length of this wire, measured parallel to the axis of the strand in which it is located, after which the wire that has this pitch has made a complete turn around the said axis of the strand.

What is meant by the direction of winding of a layer of strands or of wires is the direction that the strands or the wires form with respect to the axis of the cord or of the strand. The direction of winding is commonly designated by the letter Z or S.

The pitches, directions of winding, and diameters of the wires and of the strands are determined in accordance with standard ASTM D2969-04, 2014.

By definition, a desaturated layer of strands is one such that there is enough space left between the strands to allow an elastomer compound to pass. According to the invention, the external layer of strands is desaturated, which means that the external strands do not touch and that there is enough space between two adjacent external strands to allow an elastomer compound to pass as far as the internal strand. In other words, and again by definition, the inter-strand distance in the external layer of external strands defined, on a cross section of the cord perpendicular to the main axis of the cord, as being the shortest distance separating, on average, the circular envelopes in which two adjacent external strands can be inscribed is non-zero.

For preference, the inter-strand distance in the external layer of external strands is greater than or equal to 30 µm, more preferably greater than or equal to 40 µm and more preferably still greater than or equal to 50 µm. In one highly preferred embodiment, the inter-strand distance in the external layer of external strands is greater than or equal to 70 µm, preferably greater than or equal to 100 µm, more preferably greater than or equal to 150 µm and more preferably still greater than or equal to 200 µm.

What is meant by "at least two layers" is that the internal strand may, in certain embodiments, comprise two layers, which means to say that it comprises only two layers, but does not comprise just one or three of them; and that, in other embodiments, the internal strand may comprise three layers, which means to say that it comprises only three layers, but does not comprise just two or four of them.

In the invention, the cord has two layers of strands, which means to say that it comprises an assembly made up of two layers of strands, neither more nor less, which means to say that the assembly has two layers of strands, not one, not three, but only two. The external layer of the cord is wound around the internal layer of the cord in contact with the internal layer of the cord.

The cord according to the invention has improved penetrability in comparison with a cord in which the ratio $(p3'-p2')/p3'$ is outside of the range of ratios according to the invention, such as for example the cord in the examples of WO2015/090920 for which the ratio $(p3'-p2')/p3'$ is equal to 0.30, and of which the penetrability can be improved by virtue of the invention. The inventors instigating the invention postulate the hypothesis that this ratio makes it possible to obtain relatively large radial windows for the passage of the elastomer compound within each external strand. The radial passage windows are defined as being the intersection between, on the one hand, the space projected onto a plane parallel to the main axis of the cord between two adjacent wires of the external layer of an external strand and, on the other hand, the space projected onto a plane parallel to the main axis of the cord between two adjacent wires of the intermediate layer of this external strand. Such a radial passage window is illustrated in FIG. 14.

In addition, thanks to the fact that the external layer of the cord is desaturated, the cord according to the invention has spaces between the external strands that allow the elastomer compound to pass. Cords having a relatively high force at break because the external layer of the cord is saturated (because the external strands are in contact with one another in pairs), thereby forming an arch that absorbs the tensile forces applied to the cord, are known from the prior art. In the cord according to the invention, although the arch around the internal strand is broken, the high penetrability of the external strands rendered possible by the ratio $(p3'-p2')/p3'$ and the desaturated nature of the external layer of the cord allows the elastomer compound to penetrate, on the one hand, between the external strands and, on the other hand, between the external strands and the internal strand. In this way, the arch is at least partially restored and the drop in force at break of the cord is therefore limited while at the same time giving the cord its excellent penetrability. Furthermore, this feature allows the elastomer compound to infiltrate between the external layers of the internal and external strands so as to create a cushion of elastomer compound that at least partially absorbs the radial component of the force between the internal and external strands.

According to the invention, the direction of winding of the cord that is the opposite to the directions of winding of each external layer of each internal and external strand gives the cord better penetrability, notably between the external strands. The inventors postulate the hypothesis that, by virtue of these directions of winding, the external wires of the external strands cross the external wires of the internal strand to form a relatively point-like contact zone unlike the cords in the examples of WO2015/090920, in which the direction of winding of the cord is identical to the directions of winding of the external layers of each internal and external strand and in which the external wires of the external strands cross the external wires of the internal strand to form a less point-like and more linear contact zone, preventing the elastomer compound from passing as far as the internal strand.

Because of the invention and because of the relationship between $p2'$ and $p3'$, each external strand is a strand with cylindrical layers. Very advantageously, the internal strand is a strand with cylindrical layers regardless as to whether this internal strand has two layers or three. It will be recalled that such cylindrical layers are obtained when the various layers of a strand are wound at different pitches and/or when the directions of winding of these layers differ from one layer to the other. A strand with cylindrical layers is very highly penetrable, unlike a strand with compact layers in which the pitches of all the layers are the same and the directions of winding of all the layers are the same and exhibits far lower penetrability.

As an option and a preference, in one embodiment, the cord does not have any polymer compound, notably the cord does not have any sheath of any polymer compound covering the internal strand. In another embodiment, the cord does not have any elastomer compound, notably the cord does not have any sheath of any elastomer compound covering the internal strand.

Advantageously, the cord is metal. The term "metal cord" is understood by definition to mean a cord formed of wires made up predominantly (i.e. more than 50% of these wires) or entirely (100% of the wires) of a metallic material. Such a metal cord is preferably implemented with a steel cord, more preferably a cord made of pearlitic (or ferritic-pearlitic) carbon steel referred to as "carbon steel" below, or else made of stainless steel (by definition steel comprising at least 11% chromium and at least 50% iron). However, it is of course possible to use other steels or other alloys.

When a carbon steel is advantageously used, its carbon content (% by weight of steel) is preferably comprised between 0.4% and 1.2%, notably between 0.5% and 1.1%; these contents represent a good compromise between the mechanical properties required for the tyre and the workability of the wires.

The metal or the steel used, whether in particular it is a carbon steel or a stainless steel, may itself be coated with a metal layer which, for example, improves the workability of the metal cord and/or of its constituent elements, or the use properties of the cord and/or of the tyre themselves, such as properties of adhesion, corrosion resistance or resistance to ageing. According to one preferred embodiment, the steel used is covered with a layer of brass (Zn—Cu alloy) or of zinc.

For preference, the wires of the one same layer of a predetermined (internal or external) strand all have substantially the same diameter. Advantageously, the external strands all have substantially the same diameter. What is meant by "substantially the same diameter" is that the wires or the strands have the same diameter to within the industrial tolerances.

Advantageously, each wire of each strand has a diameter ranging from 0.15 mm to 0.60 mm, preferably from 0.20 mm to 0.50 mm, more preferentially from 0.25 mm to 0.45 mm, and more preferably still from 0.28 mm to 0.42 mm.

What is meant by a polymer compound or a polymeric compound is that the compound contains at least one polymer. For preference, such a polymer may be a thermoplastic, for example a polyester or a polyamide, a thermosetting polymer, an elastomer, for example natural rubber, a thermoplastic elastomer or a combination of these polymers.

What is meant by an elastomer compound or an elastomeric compound is that the compound contains at least one elastomer or one rubber (the two terms being synonyms) and at least one other component. For preference, the elastomer compound also contains a vulcanization system and a filler. More preferentially, the elastomer is a diene elastomer.

Advantageously, the external strands are wound in a helix around the internal strand with a pitch ranging from 40 mm to 100 mm and preferably ranging from 50 mm to 90 mm.

Advantageously, the pitches p2' and p3' satisfy the relationship $0.38 \leq (p3'-p2')/p3'$; for preference $0.40 \leq (p3'-p2')/p3'$; more preferably $0.43 \leq (p3'-p2')/p3'$; and more preferably still $0.45 \leq (p3'-p2')/p3'$. The higher the ratio $(p3'-p2')/p3'$ or, in other words, the greater the difference between p3' and p2', the better the architectural stability of each external strand. Specifically, the greater the extent to which the pitches of the intermediate and external layers of each external strand differ, the greater the crossing of the intermediate and external wires with respect to one another (contacts between the intermediate and external wires are then relatively point-like contacts), the better the external wires will mechanically hold the intermediate wires and the better will be the penetrability of each external strand of which the wires of the intermediate and external layers will then be evenly distributed within each intermediate and external layer. This mechanical integrity makes it possible to avoid, on the one hand, during manufacture of the cord, all the wires of the intermediate layer all grouping together in contact with one another under the effect of the mechanical forces exerted by the assembly tools and, on the other hand, during manufacture of a ply containing the cord or of the tyre containing the cord, all the wires of the intermediate layer grouping together all in contact with one another under the effect of the pressure of the elastomer compound penetrating the cord.

Furthermore, for a given pitch p3', by increasing the ratio $(p3'-p2')/p3'$, the inter-wire distance of the intermediate layer of each external strand is reduced. A person skilled in the art would expect to see a drop in the penetrability of each external strand. Yet, entirely unexpectedly, as the comparative tests described hereinafter show, by increasing the ratio $(p3'-p2')/p3'$, the inter-wire distance of the intermediate layer of each external strand is admittedly reduced, but the size of the radial passage windows for the elastomer compound is increased which means that the penetrability of each external strand is appreciably improved.

Advantageously, the pitches p2' and p3' satisfy the relationship $(p3'-p2')/p3' \leq 0.55$ and for preference $(p3'-p2')/p3' \leq 0.53$. Below these values, the size of the radial passage windows for the elastomer compound is at a maximum and makes it possible to optimize the penetrability of each external strand.

Advantageously, the pitch p2' is such that $8 \text{ mm} \leq p2' \leq 16 \text{ mm}$, for preference $8 \text{ mm} \leq p2' \leq 14 \text{ mm}$ and more preferably $8 \text{ mm} \leq p2' \leq 12 \text{ mm}$.

Advantageously, the pitch p3' is such that $10 \text{ mm} \leq p3' \leq 40 \text{ mm}$, for preference $15 \text{ mm} \leq p3' \leq 35 \text{ mm}$, more preferably $15 \text{ mm} \leq p3' \leq 25 \text{ mm}$ and more preferably still $17 \text{ mm} \leq p3' \leq 23 \text{ mm}$.

Pitches p2' and p3' within these preferred ranges make it possible to obtain a cord that exhibits mechanical properties compatible with tyre use, a relatively low cost and a relatively low linear cord weight.

By definition, the diameter of a strand is the diameter of the smallest circle inside which the strand can be circumscribed.

The internal strand TI has a diameter DI and each external strand TE has a diameter DE.

Advantageously, in instances in which L=6, DI/DE>1, for preference DI/DE≥1.05 and more preferably DI/DE≥1.10. This then better promotes the passage of the elastomer compound between the external strands. Advantageously, in instances in which L=6, DI/DE≤1.40, for preference DI/DE≤1.35 and more preferably DI/DE≤1.30. This then avoids having excessive space between the external strands so as to ensure, on the one hand, the architectural stability of the cord and, on the other hand, to maximize the force at break by laying as many external strands as possible while at the same time allowing the elastomer compound to pass between the external strands. This then limits the external diameter of the cord and therefore maximizes the mass of metal that can be laid in a ply. Furthermore, the thickness of the ply is reduced, as therefore are the heating, rolling resistance and mass of the tyre.

In addition, for these preferential values of DI/DE, while promoting the passage of the elastomer compound between the external strands still further, the restoration of the arch of the cord is promoted.

Advantageously, in instances in which L=7, DI/DE≥1.30, for preference DI/DE≥1.35 and more preferably DI/DE≥1.40. Advantageously, in instances in which L=7, DI/DE≤1.70, for preference DI/DE≤1.65 and more preferably DI/DE≤1.60.

Advantageously, in instances in which L=8, DI/DE≥1.60, for preference DI/DE≥1.65 and more preferably DI/DE≥1.70. Advantageously, in instances in which L=8, DI/DE≤2.0, for preference DI/DE≤1.95 and more preferably DI/DE≤1.90.

Advantageously, in instances in which L=9, DI/DE≥2.00, for preference DI/DE≥2.05 and more preferably DI/DE≥2.10. Advantageously, in instances in which L=9, DI/DE≤2.50, for preference DI/DE≤2.45 and more preferably DI/DE≤2.40.

In a similar way to the instance in which L=6, for instances in which L=7, 8 or 9, for relatively high values of DI/DE, the passage of the elastomer compound between the external strands is further promoted, and, for relatively low values of DI/DE, the architectural stability of the cord is ensured, the force at break is maximized while at the same time allowing the elastomer compound to pass between the external strands, the external diameter of the cord is limited, and the thickness of the ply is reduced, as therefore are the heating, rolling resistance and mass of the tyre. Finally, the arch of the cord is also restored.

In one embodiment, L is equal to 6, 7, 8, 9 or 10, for preference L=6, 7 or 8 and more preferably L=6.

Optionally, each internal wire of the internal strand has a diameter $d1$ greater than or equal to the diameter $d1'$ of each internal wire of each external strand, for preference each internal wire of the internal strand has a diameter $d1$ equal to the diameter $d1'$ of each internal wire of each external strand. Thus, the same diameter of wire is used in the internal layers of each internal and external strand, thereby limiting the number of different wires that need to be managed during the manufacture of the cord.

Optionally, each internal wire of the internal strand has a diameter $d1$ greater than or equal to the diameter $d2'$ of each intermediate wire of each external strand, for preference each internal wire of the internal strand has a diameter $d1$ greater than the diameter $d2'$ of each intermediate wire of each external strand.

Optionally, each internal wire of the internal strand has a diameter $d1$ greater than or equal to the diameter $d3'$ of each external wire of each external strand, for preference each internal wire of the internal strand has a diameter $d1$ greater than the diameter $d3'$ of each external wire of each external strand.

Optionally, each external wire of the internal strand has a diameter $d3$ greater than or equal to the diameter $d3'$ of each external wire of each external strand, for preference each external wire of the internal strand has a diameter $d3$ greater than the diameter $d3'$ of each external wire of each external strand. For preference, by virtue of the characteristic $d3>d3'$, each external wire of the internal strand may be able to withstand the radial component of the force exerted by the external strands on the internal strand when the cord is under tension. This characteristic $d3>d3'$ makes it possible to restore, or even to improve, the breaking force of the cord by comparison with a cord comprising an arch formed by the external strands or by comparison with a cord in which $d3 \leq d3'$. For preference, $1<d3/d3'\leq 2$, more preferably $1<d3/d3'\leq 1.5$ and more preferably still $1<d3/d3'\leq 1.25$ or $1.25<d3/d3'\leq 1.5$.

In an embodiment that promotes the compromise between penetrability and force at break, the external layer of the cord is incompletely unsaturated.

A layer that is incompletely unsaturated with strands is such that there is not enough space in this layer to add in at least one (X+1)th strand having the same diameter as the X strands of the layer. In this particular instance, there is not enough space in the external layer to add in at least one (L+1)th external strand having the same diameter as the L external strands of the external layer of the cord. Thus, the sum SIE of the inter-strand distances E of the external layer of the cord is such that SIE<DE. The sum SIE is the sum of the inter-strand distances E separating each pair of adjacent strands in the layer. The inter-strand distance of a layer is defined, in a section of the cord perpendicular to the main axis of the cord, as being the shortest distance, which, on average, separates two adjacent strands of the layer. Thus, the inter-strand distance E is calculated by dividing the sum SIE by the number of spaces separating the strands in the layer.

External Strands of the Cord According to the Invention

Advantageously, the sum SI2' of the inter-wire distances of the intermediate layer of each external strand is such that SI2'<d3' where d3' is the diameter of each external wire of each external strand, preferably SI2'≤0.8×d3'. The sum SI2' is the sum of the inter-wire distances separating each pair of adjacent wires in the layer. The inter-wire distance of a layer is defined, in a section of the cord perpendicular to the main axis of the cord, as being the shortest distance, which, on average, separates two adjacent wires of the layer. Thus, the inter-wire distance is calculated by dividing the sum SI2' by the number of spaces separating the wires in the layer.

Because the diameter $d3'$ of the external wires of the external layer of each external strand is preferably greater than the sum SI2', the external wires are prevented from penetrating the intermediate layer. This then ensures good architectural stability, thereby reducing the risk of alteration to the radial passage windows for the elastomer compound and therefore the risk of degrading the good penetrability of each external strand.

Advantageously, the intermediate layer of each external strand is desaturated, preferably incompletely unsaturated.

By definition, a desaturated layer of wires is one such that there is enough space left between the wires to allow an elastomer compound to pass. Thus, a layer that is desaturated means that the wires in this layer do not touch and that there is enough space between two adjacent wires in the layer to allow an elastomer compound to pass through the layer, which means to say that the inter-wire distance in the layer is non-zero.

For preference, the inter-wire distance in the intermediate layer of each external strand is greater than or equal to 5 μm, more preferably greater than or equal to 10 μm, more preferably still greater than or equal to 20 μm and highly preferably greater than or equal to 30 μm. In one highly advantageous embodiment, the inter-wire distance in the intermediate layer of each external strand is greater than or equal to 35 μm, more preferably greater than or equal to 50 μm and more preferably still greater than or equal to 60 μm.

The fact that the intermediate layer of each external strand is desaturated advantageously makes it easier for the elastomer compound to pass into and through each external strand.

By definition, a layer that is incompletely unsaturated is such that there is not enough space in this layer to add in at least one $(P+1)^{th}$ wire having the same diameter as the P wires of the layer. In this particular instance, there is not enough space in the intermediate layer to add in at least one $(M'+1)^{th}$ intermediate wire having the same diameter as the M' intermediate wires of the intermediate layer. In other words, what is meant by an incompletely unsaturated intermediate layer of external strands is that the sum SI2' of the inter-wire distances I2' of the intermediate layer C2' is less than the diameter $d2'$ of the intermediate wires F2' of the intermediate layer C2'.

The fact that the intermediate layer of each external strand is incompletely unsaturated makes it possible to ensure the architectural stability of the intermediate layer. This then reduces the risk of an external wire penetrating the intermediate layer, something which would alter the radial passage windows for the elastomer compound and therefore degrade the good penetrability of each external strand.

Furthermore, the fact that the intermediate layer of each external strand is incompletely unsaturated makes it possible to ensure that each external strand comprises a relatively high number of intermediate wires and therefore exhibits a relatively high force at break.

Advantageously, the external layer of each external strand is desaturated, preferably completely unsaturated. In a similar way to the intermediate layer, the fact that the external layer of each external strand is desaturated advantageously makes it easier for the elastomer compound to pass into and through each external strand.

By definition, and as already specified hereinabove, a desaturated layer of wires is one such that there is enough space left between the wires to allow an elastomer compound to pass. Thus, a layer that is desaturated means that the wires in this layer do not touch and that there is enough space between two adjacent wires in the layer to allow an elastomer compound to pass through the layer, which means to say that the inter-wire distance in the layer is non-zero.

For preference, the inter-wire distance in the external layer of each external strand is greater than or equal to 5 μm, more preferably greater than or equal to 10 μm, more preferably still greater than or equal to 20 μm and highly preferably greater than or equal to 30 μm. In one highly advantageous embodiment, the inter-wire distance in the external layer of each external strand is greater than or equal to 35 μm, more preferably greater than or equal to 50 μm and more preferably still greater than or equal to 60 μm.

By definition, a completely unsaturated layer is, as opposed to a completely unsaturated layer, such that there is sufficient space in this layer to add in at least one $(P+1)^{th}$ wire having the same diameter as the P wires of the layer, it thus being possible for a plurality of wires to be, or to not be, in contact with one another. In this particular instance, there is enough space in the external layer of each external strand to add in at least one $(N'+1)^{th}$ wire having the same diameter as the N' external wires of the external layer. In other words, what is meant by a incompletely unsaturated external layer of external strands is that the sum SI3' of the inter-wire distances I3' of the external layer C3' is greater than the diameter d3' of the external wires F3' of the external layer C3'.

The fact that the external layer of each external strand is completely unsaturated makes it possible to maximize the penetration of the elastomer compound into each external strand.

In one advantageous embodiment, the internal wire of each external strand has a diameter d1' greater than or equal to the diameter d3' of each external wire of each external strand, for preference the internal wire of each external strand has a diameter d1' greater than the diameter d3' of each external wire of each external strand. The use of diameters such that d1'>d3' makes it possible to promote the penetrability of the elastomer compound through the external layer.

In another advantageous embodiment, the internal wire of each external strand has a diameter d1' greater than or equal to the diameter d2' of each intermediate wire of each external strand, for preference each internal wire of each external strand has a diameter d1' greater than the diameter d2' of each intermediate wire of each external strand. The preferred use of diameters such that d1'>d2' makes it possible to promote the penetrability of the elastomer compound through the intermediate layer.

In preferred embodiments, Q'=1, M'=5 or 6 and N'=10, 11 or 12, for preference Q'=1, M'=5 or 6, N'=10 or 11 and more preferably Q'=1, M'=6 and N'=11.

More advantageously, Q'=1, M'=5 or 6, N'=10 or 11,
the internal wire of each external strand has a diameter d1' greater than or equal to the diameter d2' of each intermediate wire of the said external strand, and
the internal wire of each external strand has a diameter d1' greater than or equal to the diameter d3' of each external wire of the said external strand.

More advantageously still, Q'=1, M'=6, N'=11,
the internal wire of each external strand has a diameter d1' greater than the diameter d2' of each intermediate wire of the said external strand, and
the internal wire of each external strand has a diameter d1' greater than the diameter d3' of each external wire of the said external strand.

Such an external strand exhibits the advantages of architectural stability and of penetrability as set out hereinabove. In particular, the facts that the intermediate and external layers are desaturated, the intermediate layer is incompletely saturated and the external layer is completely unsaturated are obtained by using different diameters of wire.

Highly advantageously, with each intermediate wire of each external strand having a diameter d2' and each external wire of each external strand having a diameter d3', d2'=d3'. Thus, the same diameter of wire is used in the intermediate and external layers of each external strand, thereby limiting the number of different wires that need to be managed during the manufacture of the cord.

Internal Strand of the Cord According to the Invention

Advantageously, the external layer of the internal strand is desaturated, preferably completely unsaturated. The fact that the external layer of the internal strand is desaturated advantageously makes it easier for the elastomer compound to pass as far as the centre of the internal strand.

By definition, and as already specified hereinabove, a desaturated layer of wires is one such that there is enough space left between the wires to allow an elastomer compound to pass. Thus, a layer that is desaturated means that the wires in this layer do not touch and that there is enough space between two adjacent wires in the layer to allow an elastomer compound to pass through the layer, which means to say that the inter-wire distance in the layer is non-zero.

For preference, the inter-wire distance in the external layer of the internal strand is greater than or equal to 5 μm, more preferably greater than or equal to 10 μm, more preferably still greater than or equal to 20 μm and highly preferably greater than or equal to 30 μm. In one highly advantageous embodiment, the inter-wire distance in the external layer of the internal strand is greater than or equal to 35 μm, more preferably greater than or equal to 50 μm and more preferably still greater than or equal to 60 μm.

The external layer of the internal strand is preferably completely saturated, that is to say there is enough space in the external layer to add in at least one $(N+1)^{th}$ wire having the same diameter as the N wires of the external layer. In other words, what is meant by a completely unsaturated external layer of the internal strand is that the sum SI3 of the inter-wire distances I3 of the external layer C3 is greater than the diameter d3 of the external wires F3 of the external layer C3.

The fact that the external layer of the internal strand is completely unsaturated makes it possible to maximize the penetration of the elastomer compound into the internal strand.

In some preferred embodiments, each internal wire of the internal strand has a diameter d1 greater than or equal to the diameter d3 of each external wire of the internal strand.

In one embodiment, the internal strand has two layers. In this embodiment, the external layer of the internal strand is wound around the internal layer of the internal strand in contact with the internal layer of the internal strand. In this embodiment, the internal strand comprises a collection of wires which is made up of two layers of wires, neither more nor less, which means to say that the collection of wires has two layers of wires, not one, not three, but only two.

In one preferred embodiment, Q>1, for preference Q=2, 3 or 4. In instances in which Q is equal to 1, there would be a risk of seeing the internal wire of the internal strand radially leave the internal strand and even the cord, under the effect of the repeated compressive loadings applied to the cord. Thanks to the presence of several wires in the internal layer of the internal strand (Q>1), this risk is reduced, the compressive loadings then being distributed over the plurality of wires of the internal layer.

In a first alternative form, Q=2 and N=7 or 8, for preference Q=2, N=7.

In a second alternative form, Q=3 and N=7, 8 or 9, for preference Q=3, N=8.

In a third alternative form, Q=4 and N=7, 8, 9 or 10, for preference Q=4, N=9.

Highly advantageously, each internal wire of the internal strand has a diameter d1 equal to the diameter d3 of each external wire of the internal strand. Thus, the same diameter of wire is preferably used in the internal and external layers of the internal strand, thereby limiting the number of different wires that need to be managed during the manufacture of the cord.

In a first embodiment of the cord, the intermediate layer of each external strand is wound around the internal layer of each external strand in a direction of winding identical to the direction of winding of the cord.

In a first alternative of this first embodiment, in the case that Q>1, the internal layer of the internal strand is wound in a helix with a direction of winding identical to the direction of winding of the cord.

In a second alternative of this first embodiment, in the case that Q>1, the internal layer of the internal strand is wound in a helix with a direction of winding opposite to the direction of winding of the cord.

In a second embodiment of the cord, the intermediate layer of each external strand is wound around the internal layer of each external strand in a direction of winding opposite to the direction of winding of the cord.

In a first alternative of this second embodiment, in the case that Q>1, the internal layer of the internal strand is wound in a helix with a direction of winding identical to the direction of winding of the cord.

In a second alternative of this second embodiment, in the case that Q>1, the internal layer of the internal strand is wound in a helix with a direction of winding opposite to the direction of winding of the cord. In this particularly preferred second alternative of the second embodiment of the cord, the rubbing-together of the wires of the adjacent layers and therefore the wearing thereof is limited.

Thus, in the context of the invention, in the case of an internal strand having 2 layers, it is possible to envisage the combinations of direction of winding that have been collated in Table A below:

TABLE A

| | | Cord | | | | | | | |
|---|---|---|---|---|---|---|---|---|---|
| Internal strand | Direction for C1 | S | Z | Z | S | S | Z | Z | S |
| | Direction for C3 | Z | Z | S | S | Z | Z | S | S |
| External strand | Direction for C1' | inf | inf | inf | inf | inf | inf | inf | inf |
| | Direction for C2' | S | S | Z | Z | Z | Z | S | S |
| | Direction for C3' | Z | Z | S | S | Z | Z | S | S |
| Direction of winding of the cord | | S | S | Z | Z | S | S | Z | Z |

In another particularly advantageous embodiment that improves the force at break of the cord, the internal strand has three layers and comprises:
  an intermediate layer made up of M intermediate wires wound around the internal layer, and
  an external layer made up of N external wires wound around the intermediate layer.

In this embodiment, the external layer of the internal strand is wound around the intermediate layer of the internal strand in contact with the intermediate layer of the internal strand and the intermediate layer of the internal strand is wound around the internal layer of the internal strand in contact with the internal layer of the internal strand. In this embodiment, the internal strand comprises a collection of wires which is made up of three layers of wires, neither more nor less, which means to say that the collection of wires has three layers of wires, not two, not four, but only three.

Advantageously, the sum SI2 of the inter-wire distances of the intermediate layer is such that SI2<d3 where d3 is the diameter of each external wire of the internal strand, preferably SI2≤0.8×d3. In a similar way to the external strand, because the diameter d3 of the external wires of the external layer of the internal strand is preferably greater than the sum SI2, the external wires are prevented from penetrating the intermediate layer. This then ensures good architectural stability, thereby reducing the risk of alteration to the radial passage windows for the elastomer compound and therefore the risk of degrading the good penetrability of the internal strand.

Advantageously, the intermediate layer of the internal strand is desaturated, preferably incompletely unsaturated.

By definition, a desaturated layer of wires is one such that there is enough space left between the wires to allow an elastomer compound to pass. Thus, a layer that is desaturated means that the wires in this layer do not touch and that there is enough space between two adjacent wires in the layer to allow an elastomer compound to pass through the layer, which means to say that the inter-wire distance in the layer is non-zero.

For preference, the inter-wire distance in the intermediate layer of the internal strand is greater than or equal to 5 μm, more preferably greater than or equal to 10 μm, more preferably still greater than or equal to 20 μm and highly preferably greater than or equal to 30 μm. In one highly advantageous embodiment, the inter-wire distance in the intermediate layer of the internal strand is greater than or equal to 35 μm, more preferably greater than or equal to 50 μm and more preferably still greater than or equal to 60 μm.

The fact that the intermediate layer of the internal strand is desaturated advantageously makes it easier for the elastomer compound to pass as far as the centre of the internal strand.

The intermediate layer of the internal strand is preferably incompletely unsaturated, that is to say there is not enough space in the intermediate layer to add in at least one $(M+1)^{th}$ wire having the same diameter as the M wires of the intermediate layer. In other words, what is meant by an incompletely unsaturated intermediate layer of the internal strand is that the sum SI2 of the inter-wire distances I2 of the intermediate layer C2 is less than the diameter d2 of the intermediate wires F2 of the intermediate layer C2.

The fact that the intermediate layer of the internal strand is incompletely unsaturated makes it possible to ensure the architectural stability of the intermediate layer. Furthermore, the fact that the intermediate layer of the internal strand is incompletely unsaturated makes it possible to ensure that the internal strand comprises a relatively high number of intermediate wires and therefore exhibits a relatively high force at break.

In some preferred embodiments, each internal wire of the internal strand has a diameter d1 greater than the diameter d3 of each external wire of the internal strand. The use of diameters such that d1>d3 makes it possible to promote the penetrability of the elastomer compound through the external layer.

In some preferred embodiments, each internal wire of the internal strand has a diameter d1 greater than or equal to the diameter d2 of each intermediate wire of the internal strand, for preference each internal wire of the internal strand has a diameter d1 greater than the diameter d2 of each intermediate wire of the internal strand. The preferred use of diameters such that d1>d2 makes it possible to promote the penetrability of the elastomer compound through the intermediate layer.

In preferred alternative forms of this embodiment, Q=1, 2, 3 or 4, for preference Q=1, 2 or 3 and more preferably Q=1 or 3.

In one preferred embodiment, Q=1. In the embodiment in which Q=1, and when the cord, unlike that of the invention, is insufficiently penetrated, there is a risk of seeing the internal wire of the internal strand radially leave the internal strand and even the cord, under the effect of the repeated compressive loadings applied to the cord. By virtue of the invention, because of the excellent penetration of the internal strand and despite the fact that Q=1, the elastomer compound acts like a wrapping layer around the internal strand, notably around the external and intermediate layers of the internal strand, preventing the internal wire from coming out, even under the repeated compressive loadings.

In the embodiment in which Q=1, the M intermediate wires are wound around the internal layer with a pitch p2 and the N external wires are wound around the intermediate layer with a pitch p3, the pitches p2 and p3 then satisfying: 0.36≤(p3−p2)/p3≤0.57. Such a ratio (p3−p2)/p3 makes it possible to obtain relatively large radial passage windows for the elastomer compound within the internal strand.

Advantageously, the pitches p2 and p3 satisfy the relationship 0.38≤(p3−p2)/p3; for preference 0.40≤(p3−p2)/p3; more preferably 0.43≤(p3−p2)/p3; and more preferably still 0.45≤(p3−p2)/p3. In a similar way to the external strand, the higher the ratio (p3−p2)/p3 or, in other words, the greater the difference between p3 and p2, the better the architectural stability of the internal strand.

Advantageously, the pitches p2 and p3 satisfy the relationship (p3−p2)/p3≤0.55 and for preference (p3−p2)/p3≤0.53. Below these values, the size of the radial passage windows for the elastomer compound is at a maximum and makes it possible to optimize the penetrability of the internal strand.

Advantageously, the pitch p2 is such that 8 mm≤p2≤16 mm, for preference 8 mm≤p2≤14 mm and more preferably 8 mm≤p2≤12 mm.

Advantageously, the pitch p3 is such that 10 mm≤p3≤40 mm, for preference 15 mm≤p3≤35 mm, more preferably 15 mm≤p3≤25 mm and more preferably still 17 mm≤p3≤23 mm.

Pitches p2 and p3 within these preferred ranges make it possible to obtain a cord that exhibits mechanical properties compatible with tyre use, a relatively low cost and a relatively low linear cord weight.

In one preferred embodiment, Q=1, M=5 or 6 and N=10, 11 or 12, for preference Q=1, M=5 or 6, N=10 or 11 and more preferably Q=1, M=6 and N=11.

More advantageously
Q=1, M=5 or 6, N=10 or 11,
the internal wire of the internal strand has a diameter d1 greater than or equal to the diameter d2 of each intermediate wire of the internal strand, and
the internal wire of the internal strand has a diameter d1 greater than or equal to the diameter d3 of each external wire of the internal strand.

More advantageously still
Q=1, M=6, N=11,
the internal wire of the internal strand has a diameter d1 greater than the diameter d2 of each intermediate wire of the internal strand, and
the internal wire of the internal strand has a diameter d1 greater than the diameter d3 of each external wire of the internal strand.

Such an internal strand exhibits the advantages of architectural stability and of penetrability as set out hereinabove. In particular, the facts that the intermediate and external layers are desaturated, the intermediate layer is incompletely saturated and the external layer is completely unsaturated are obtained by using different diameters of wire.

In another preferred embodiment, Q=3, M=8 or 9 and N=13, 14 or 15, for preference Q=3, M=8 or 9, N=14 or 15, more preferably Q=3, M=9, N=14 or 15 and more preferably still Q=3, M=9 and N=15. In the embodiment in which Q=3, and when the cord, unlike that of the invention, is insufficiently penetrated, there is a risk of seeing a significant spread of corrosive agents between the Q=3 internal wires which delimit a central capillary which very much encourages them to spread along the cord. By virtue of the invention and in the embodiment in which Q=3 with the cord being excellently very well penetrated, the elastomer compound prevents the corrosive agents from accessing the central capillary and, in the best of cases in which the central capillary is itself penetrated, prevents these corrosive agents from spreading along the cord.

More advantageously
Q=3, M=8 or 9, N=14 or 15,
the internal wires of the internal strand have a diameter d1 greater than or equal to the diameter d2 of each intermediate wire of the internal strand, and
the internal wires of the internal strand have a diameter d1 greater than or equal to the diameter d3 of each external wire of the internal strand.

More advantageously still
Q=3, M=9, N=14 or 15,
the internal wires of the internal strand have a diameter d1 greater than the diameter d2 of each intermediate wire of the internal strand, and
the internal wires of the internal strand have a diameter d1 greater than the diameter d3 of each external wire of the internal strand.

Such an internal strand exhibits the advantages of architectural stability and of penetrability as set out hereinabove. In particular, the facts that the intermediate and external layers are desaturated, the intermediate layer is incompletely saturated and the external layer is completely unsaturated are obtained by using different diameters of wire.

Highly advantageously, with each intermediate wire of the internal strand having a diameter d2 and each external wire of the internal strand having a diameter d3, d2=d3. Thus, the same diameter of wire is used in the intermediate and external layers of the internal strand, thereby limiting the number of different wires that need to be managed during the manufacture of the cord.

For preference, each intermediate wire of the internal strand has a diameter d2 greater than or equal to the diameter d2' of each intermediate wire of each external strand, for preference each intermediate wire of the internal strand has a diameter d2 greater than the diameter d2' of each intermediate wire of each external strand.

In a first embodiment of the cord, the intermediate layer of each external strand is wound around the internal layer of each external strand in a direction of winding identical to the direction of winding of the cord.

In a first alternative form of this first embodiment, the intermediate layer of the internal strand is wound around the internal layer of the internal strand in a direction of winding identical to the direction of winding of the cord.

In a second alternative form of this first embodiment, the intermediate layer of the internal strand is wound around the internal layer of the internal strand in a direction of winding opposite to the direction of winding of the cord.

In each of the first and second alternative forms of this first embodiment which have been described hereinabove, in the case that Q>1, the internal layer of the internal strand is wound in a helix in a direction of winding identical to the direction of winding of the cord or, as an alternative, in a direction of winding opposite to the direction of winding of the cord.

In a second embodiment of the cord, the intermediate layer of each external strand is wound around the internal layer of each external strand in a direction of winding opposite to the direction of winding of the cord.

In a first alternative form of this second embodiment, the intermediate layer of the internal strand is wound around the internal layer of the internal strand in a direction of winding identical to the direction of winding of the cord.

In a second alternative form of this second embodiment, the intermediate layer of the internal strand is wound around the internal layer of the internal strand in a direction of winding opposite to the direction of winding of the cord. In this particularly preferred second alternative form of the second embodiment of the cord, the rubbing-together of the wires of the adjacent layers and therefore the wearing thereof is limited.

In each of the first and second alternative forms of this second embodiment which have been described hereinabove, in the case that Q>1, the internal layer of the internal strand is wound in a helix in a direction of winding identical to the direction of winding of the cord or, as an alternative, in a direction of winding opposite to the direction of winding of the cord.

Thus, in the context of the invention, in the case of an internal strand having 3 layers, it is possible to envisage the combinations of direction of winding that have been collated in Table B below, where ND signifies:

in the case of an internal layer of the internal strand which layer is made up of a single wire, that the wire has no direction because its pitch is infinite, and in the case of an internal layer of the internal strand which layer is made up of several wires (Q>1), that the direction of winding may just as well be S as Z:

TABLE B

|  |  | Cord | | | | | | | |
|---|---|---|---|---|---|---|---|---|---|
| Internal strand | Direction for C1 | ND | ND | ND | ND | ND | ND | ND | ND |
|  | Direction for C2 | S | Z | Z | S | S | Z | Z | S |
|  | Direction for C3 | Z | Z | S | S | Z | Z | S | S |
| External strand | Direction for C1' | inf | inf | inf | inf | inf | inf | inf | inf |
|  | Direction for C2' | S | S | Z | Z | Z | Z | S | S |
|  | Direction for C3' | Z | Z | S | S | Z | Z | S | S |
|  | Direction of winding of the cord | S | S | Z | Z | S | S | Z | Z |

In one embodiment, the internal strand is of the type rubberized in situ. Such a strand comprises, prior to assembly of the cord, a layer of a polymer compound, notably an elastomer compound, arranged between at least two radially adjacent layers of wires, possibly between each of the radially adjacent layers of wires. Such a strand that is rubberized in situ is notably described in WO2010/054790.

In another embodiment, the internal strand is of the type not rubberized in situ. What is meant by not rubberized in situ is that, prior to the assembly of the cord, the internal strand is made up of the wires of the various layers and does not have any polymer compound, notably any elastomer compound.

Tyre According to the Invention

Another subject of the invention is a tyre comprising at least one cord as defined above.

For preference, the tyre has a carcass reinforcement anchored in two beads and surmounted radially by a crown reinforcement which is itself surmounted by a tread, the crown reinforcement being joined to the said beads by two sidewalls, and comprising at least one cord as defined above.

In one preferred embodiment, the crown reinforcement comprises a protective reinforcement and a working reinforcement, the working reinforcement comprising at least one cord as defined hereinabove, the protective reinforcement being interposed radially between the tread and the working reinforcement.

The cord is most particularly intended for industrial vehicles selected from heavy vehicles such as "heavy-duty vehicles"—i.e. underground trains, buses, road haulage vehicles (lorries, tractors, trailers), off-road vehicles, agricultural vehicles or construction plant vehicles, or other transport or handling vehicles.

As a preference, the tyre is for a vehicle of the construction plant type. Thus, the tyre has a size in which the diameter, in inches, of the tyre of the rim on which the tyre is intended to be mounted is greater than or equal to 40 inches.

BRIEF DESCRIPTION OF THE FIGURES

The invention will be better understood from reading the following description, given solely by way of non-limiting example and with reference to the drawings in which:

FIG. 13 is a schematic view in projection onto a plane containing the axis of an external strand prior to assembly of the cord according to the first embodiment of the invention; and FIG. 14 is a detailed view of the region XIV depicting a radial passage window delimited by wires of an intermediate layer and wires of an external layer of the external strand of FIG. 13.

DETAILED DESCRIPTION

Any range of values denoted by the expression "between a and b" represents the range of values extending from more than a to less than b (namely excluding the end-points a and b), whereas any range of values denoted by the expression "from a to b" means the range of values extending from the end-point "a" as far as the end-point "b", namely including the strict end-points "a" and "b".

Example of a Tyre According to the Invention

A frame of reference X, Y, Z corresponding to the usual respectively axial (X), radial (Y) and circumferential (Z) orientations of a tyre has been depicted in the figures.

The "median circumferential plane" M of the tyre is the plane which is normal to the axis of rotation of the tyre and which is situated equidistantly from the annular reinforcing structures of each bead.

Figure 1:
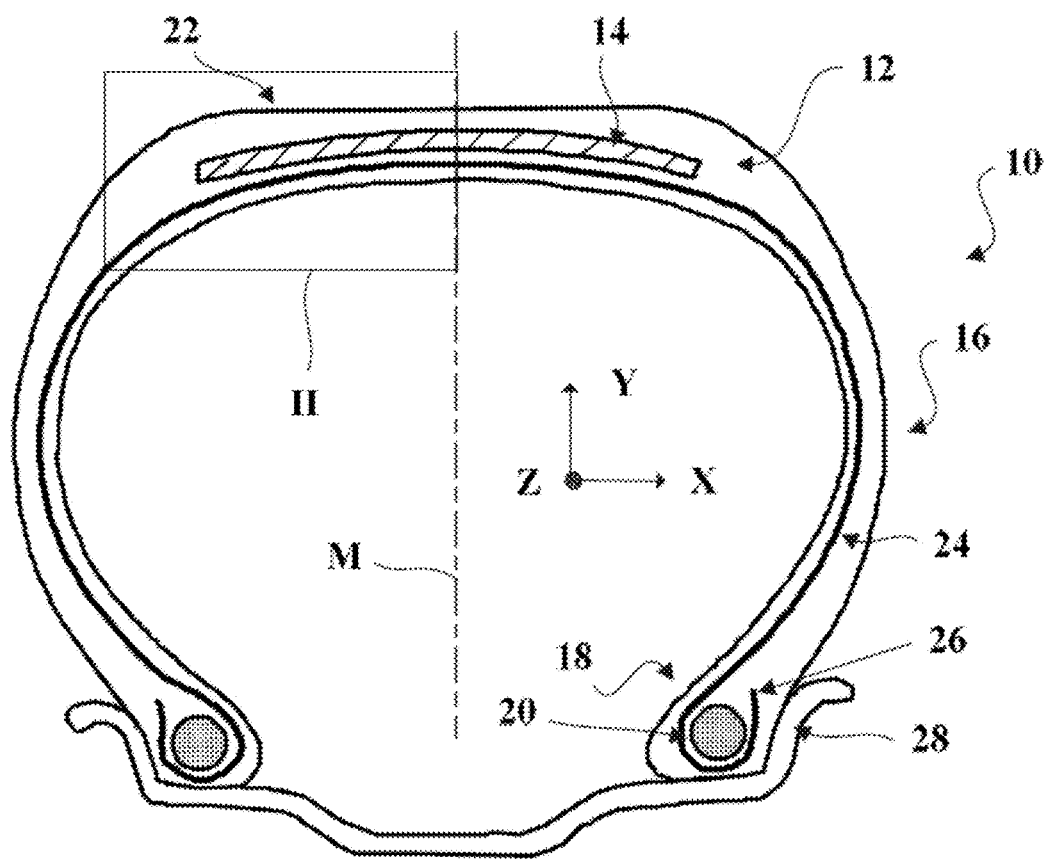
FIG. 1 is a view in cross section perpendicular to the circumferential direction of a tyre according to the invention.
Figure 2:
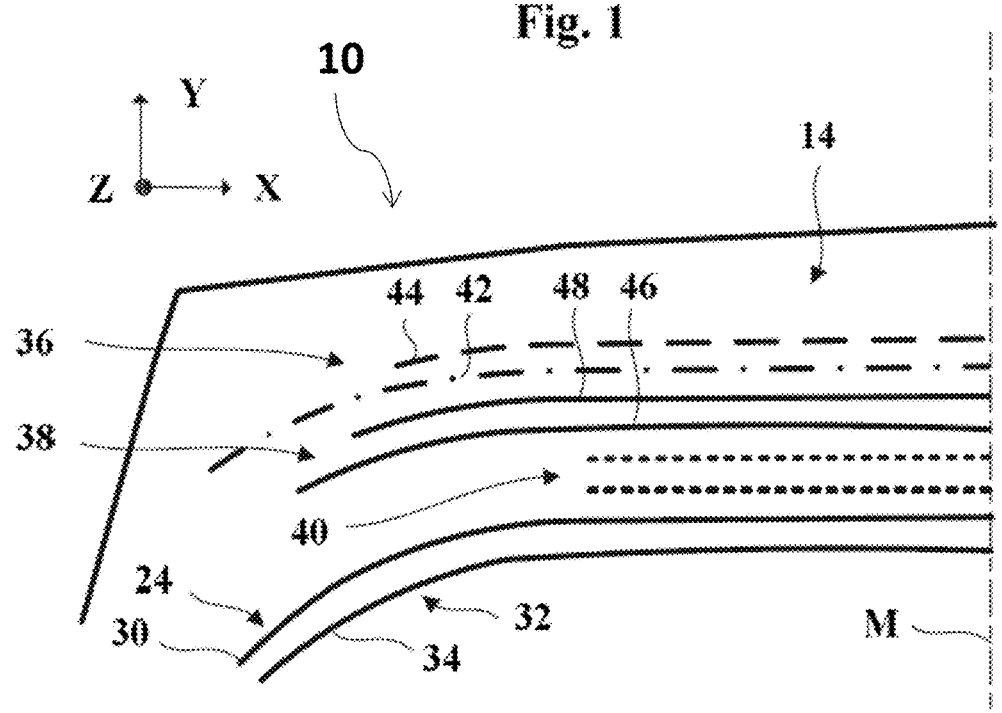
FIG. 2 is a detail view of the region II of FIG. 1.

FIGS. 1 and 2 depict a tyre according to the invention and denoted by the general reference 10.

The tyre 10 is for a heavy vehicle of construction plant type, for example of "dumper" type. Thus, the tyre 10 has a dimension of the type 53/80R63.

The tyre 10 has a crown 12 reinforced by a crown reinforcement 14, two sidewalls 16 and two beads 18, each of these beads 18 being reinforced with an annular structure, in this instance a bead wire 20. The crown reinforcement 14 is surmounted radially by a tread 22 and connected to the beads 18 by the sidewalls 16. A carcass reinforcement 24 is anchored in the two beads 18 and in this instance wound around the two bead wires 20 and comprises a turnup 26 positioned towards the outside of the tyre 10, which is shown here fitted onto a wheel rim 28. The carcass reinforcement 24 is surmounted radially by the crown reinforcement 14.

The carcass reinforcement 24 comprises at least one carcass ply 30 reinforced by radial carcass cords (not depicted). The carcass cords are positioned substantially parallel to one another and extend from one bead 18 to the other so as to form an angle comprised between 80° and 90° with the median circumferential plane M (plane perpendicular to the axis of rotation of the tyre which is situated midway between the two beads 18 and passes through the middle of the crown reinforcement 14).

The tyre 10 also comprises a sealing ply 32 made up of an elastomer (commonly known as "inner liner") which defines the radially internal face 34 of the tyre 10 and which is intended to protect the carcass ply 30 from the diffusion of air coming from the space inside the tyre 10.

The crown reinforcement 14 comprises, radially from the outside towards the inside of the tyre 10, a protective reinforcement 36 arranged radially on the inside of the tread 22, a working reinforcement 38 arranged radially on the inside of the protective reinforcement 36 and an additional reinforcement 40 arranged radially on the inside of the working reinforcement 38. The protective reinforcement 36 is thus interposed radially between the tread 22 and the working reinforcement 38. The working reinforcement 38 is interposed radially between the protective reinforcement 36 and the additional reinforcement 40.

The protective reinforcement 36 comprises first and second protective plies 42, 44 comprising protective metal cords, the first ply 42 being arranged radially on the inside of the second ply 44. Optionally, the protective metal cords make an angle at least equal to 10°, preferably in the range from 10° to 35° and more preferably from 15° to 30°, with the circumferential direction Z of the tyre.

The working reinforcement 38 comprises first and second working plies 46, 48, the first ply 46 being arranged radially on the inside of the second ply 48. Each ply 46, 48 comprises at least one cord 50. Optionally, the working metal cords 50 are crossed from one working ply to the other and make an angle at most equal to 60°, preferably in the range from 15° to 40°, with the circumferential direction Z of the tyre.

The additional reinforcement 40, also referred to as a limiting block, the purpose of which is to absorb in part the mechanical stresses of inflation, comprises, for example and as known per se, additional metallic reinforcing elements, for example as described in FR 2 419 181 or FR 2 419 182, making an angle at most equal to 10°, preferably in the range from 5° to 10°, with the circumferential direction Z of the tyre 10.

Cord According to a First Embodiment of the Invention

Figure 3:
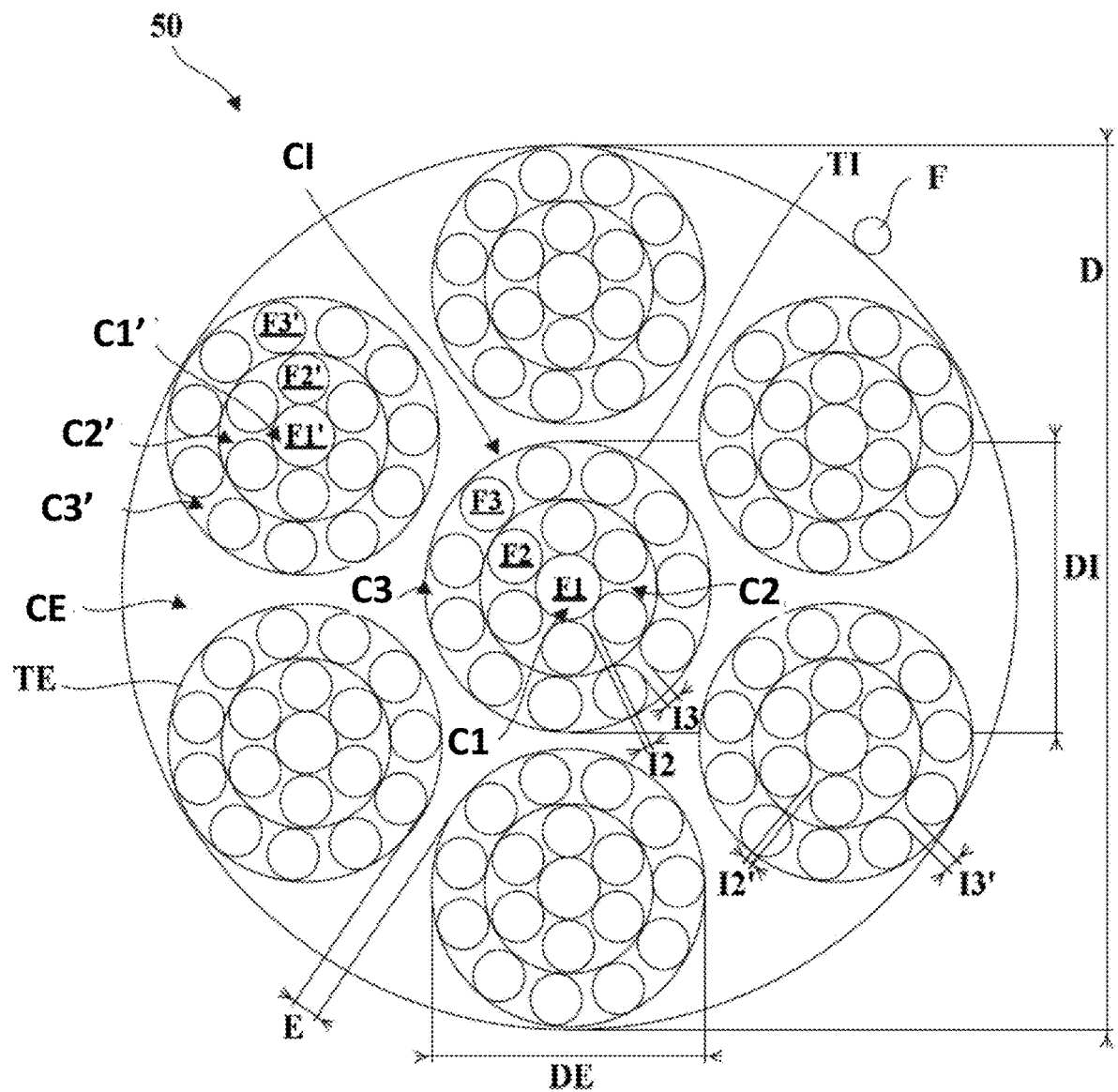
FIG. 3 is a schematic view in section perpendicular to the axis of the cord (which is assumed to be straight and at rest) of a $[(0.38+(6+11)\times0.35)+6\times(0.38+(6+11)\times0.30)]+0.28$ cord according to a first embodiment of the invention.

FIG. 3 depicts the cord 50 according to a first embodiment of the invention.

The cord 50 is metal and of the multi-strand type with two cylindrical layers. Thus, it will be understood that there are two layers, not more, not less, of strands of which the cord 50 is made. The layers of strands are adjacent and concentric. The cord 50 is devoid of polymer compound and of elastomer compound when it is not integrated into the tyre.

The cord 50 comprises an internal layer CI of the cord 50, and an external layer CE of the cord 50. The internal layer CI is made up of a single internal strand TI. The external layer CE is made up of L>1 external strands, which means to say of a plurality of external strands TE. In this instance, L=6, 7, 8, 9 or 10, for preference L=6, 7 or 8 and in this instance L=6.

The cord 50 also comprises a wrapper F made up of a single wrapping wire.

The internal strand TI has an infinite pitch.

The external layer CE is wound around the internal layer CI in a direction of winding of the cord, in this instance the S-direction. The external strands TI are wound in a helix around the internal strand TI with a pitch p such that 40 mm≤p≤100 mm and, for preference, 50 mm≤p≤90 mm. Here, p=70 mm.

The wrapper F is wound around the external layer CE in a direction of winding of the wrapper, in this instance in the opposite to the direction of winding of the cord, in this instance in the Z-direction. The wrapping wire is wound in a helix around the external strands TE with a pitch pf such that 2 mm≤pf≤10 mm and, for preference, 3 mm≤pf≤8 mm. Here, pf=5.1 mm.

The assembly made up of the internal CI and external CE layers, which means to say the cord 50 without the wrapper F, has a diameter D greater than or equal to 4 mm, and less than or equal to 6 mm, preferably less than or equal to 5 mm, and more preferably less than or equal to 4.3 mm. Here, D=4.9 mm.

The external layer CE of the cord 50 is desaturated. The mean inter-strand distance E separating two adjacent external strands TE is greater than or equal to 30 µm, more preferably greater than or equal to 40 µm and more preferably still greater than or equal to 50 µm. In this embodiment, the inter-strand distance of the external layer of external strands is greater than or equal to 70 µm. Here, E=87.3 µm.

The internal strand TI has a diameter DI and each external strand TE has a diameter DE which are such that the ratio DI/DE>1, for preference DI/DE≥1.05 and more preferably DI/DE≥1.10. This ratio DI/DE is also such that DI/DE≤1.40, for preference DI/DE≤1.35 and more preferably DI/DE≤1.30. In this case, DI=1.78 mm, DE=1.580 mm and DI/DE=1.13.

The external layer CE of the cord 50 is incompletely unsaturated. Specifically, SIE=6×0.087=0.52 mm, which is a value lower than DE=1.58 mm.

Internal Strand TI of the Cord 50

The internal strand TI has at least two layers. In this instance, the internal strand TI has three layers. The internal strand TI comprises, in this instance is made up of, three layers, not more, not less.

The internal strand TI comprises an internal layer C1 made up of Q internal wire(s) F1, an intermediate layer C2 made up of M intermediate wires F2 wound in a helix around the internal layer C1, and an external layer C3 made up of N external wires F3 wound in a helix around the internal layer C1 and around and in contact with the intermediate layer C2.

Q=1, 2, 3 or 4, for preference Q=1, 2 or 3 and more preferably here Q=1.

Where Q=1, M=5 or 6 and N=10, 11 or 12, for preference Q=1, M=5 or 6 and N=10 or 11 and here Q=1, M=6 and N=11.

The internal wire F1 has an infinite pitch.

The intermediate layer C2 of the internal strand TI is wound around the internal layer C1 of the internal strand TI in a direction of winding Z which is the opposite to the direction of winding of the cord, S. The M intermediate wires F2 are wound in a helix around the internal wire F1 with a pitch p2 such that 8 mm≤p2≤16 mm and, for preference, 8 mm≤p2≤14 mm. Here, p2=14 mm.

The external layer C3 of the internal strand TI is wound around the internal C1 and intermediate C2 layers of the internal strand TI in a direction of winding Z that is the opposite to the direction of winding of the cord S and in the same direction Z as the intermediate layer C2 of the internal strand TI. The N external wires F3 are wound in a helix around the M intermediate wires F2 with a pitch p3 such that 10 mm≤p3≤40 mm, for preference 15 mm≤p3≤35 mm, more preferably 15 mm≤p3≤25 mm and more preferably still 17 mm≤p3≤23 mm. Here, p3=20 mm.

The intermediate layer C2 of the internal strand TI is desaturated and incompletely unsaturated. The inter-wire distance I2 of the intermediate layer C2 which on average separates the M intermediate wires is greater than or equal to 5 µm. The inter-wire distance I2 is preferably greater than or equal to 10 µm and is here equal to 11.6 µm. Because the intermediate layer C2 is incompletely unsaturated, the sum SI2 of the inter-wire distances I2 of the intermediate layer C2 is less than the diameter d2 of the intermediate wires F2 of the intermediate layer C2. Here, the sum SI2=6×0.0116=0.07 mm, which is a value strictly less than d2=0.35 mm.

The sum SI2 of the inter-wire distances I2 of the intermediate layer C2 is less than the diameter d3 of the external wires F3 of the external layer C3 and preferably less than or equal to 0.8×d3. Here, the sum SI2=6×0.0116=0.07 mm, which is a value strictly less than d3=0.35 mm.

The external layer C3 of the internal strand TI is desaturated and completely unsaturated. The inter-wire distance I3 of the external layer C3 which on average separates the N external wires is greater than or equal to 5 µm. The inter-wire distance I3 is preferably greater than or equal to 10 µm, more preferably greater than or equal to 20 µm and more preferably still greater than or equal to 30 µm. In this embodiment, the inter-wire distance I3 is preferably greater than or equal to 35 µm and is here equal to 45 µm. The sum SI3 of the inter-wire distances I3 of the external layer C3 is greater than the diameter d3 of the external wires F3 of the external layer C3. Here, the sum SI3=11×0.045=0.50 mm, which is a value strictly greater than d3=0.35 mm.

Each internal, intermediate and external wire of the internal strand TI respectively has a diameter d1, d2 and d3. Each internal wire diameter d1, intermediate wire diameter d2 and external wire diameter d3 of the internal strand TI ranges from 0.15 mm to 0.60 mm, preferably from 0.20 mm to 0.50 mm, more preferably from 0.25 mm to 0.45 mm, and more preferably still from 0.28 mm to 0.42 mm.

The internal wire F1 of the internal strand TI has a diameter d1 greater than or equal to the diameter d2 of each intermediate wire F2 of the internal strand TI. The internal wire F1 of the internal strand TI has a diameter d1 greater than or equal to the diameter d3 of each external wire F3 of the internal strand TI. Each diameter d2 of each intermediate wire F2 of the internal strand TI and each diameter d3 of each external wire F3 of the internal strand TI are such that d2=d3.

In this instance, d1>d2 and d1>d3 and d1=0.38 mm, d2=d3=0.35 mm.

External Strands TE of the Cord 50

Each external strand TE has three layers. Thus, each external strand TE comprises, in this instance is made up of, three layers, not more, not less.

Each external strand TE comprises an internal layer C1' made up of Q'=1 internal wire, an intermediate layer C2' made up of M' intermediate wires F2' wound in a helix around the internal layer C1', and an external layer C3' made up of N' external wires F3' wound in a helix around the internal layer C1' and around and in contact with the intermediate layer C2'.

Q'=1, M'=5 or 6 and N'=10, 11 or 12, for preference here Q'=1, M'=5 or 6 and N'=10 or 11 and here Q'=1, M'=6, N'=11.

The internal wire F1' has an infinite pitch.

The intermediate layer C2' of each external strand TE is wound around the internal layer C1' of each external strand TE in a direction of winding Z opposite to the direction of winding S of the cord. The M' intermediate wires F2' are wound in a helix around the internal wire(s) F1' with a pitch p2' such that 8 mm≤p2'≤16 mm, for preference 8 mm≤p2'≤14 mm, and more preferably 8 mm≤p2'≤12 mm. Here, p2'=10 mm.

The external layer C3' of each external strand TE is wound around the intermediate layer C2' of each external strand TE in a direction of winding Z that is the opposite to the direction of winding S of the cord and in the same direction Z as the intermediate layer C2' of each external strand TE and in the same direction Z as the external layer C3 of the internal strand TI. The N' external wires F3' are wound in a helix around the M' intermediate wires F2' with a pitch p3' such that 10 mm≤p3'≤40 mm, for preference 15 mm≤p3'≤35 mm, more preferably 15 mm≤p3'≤25 mm and more preferably still 17 mm≤p3'≤23 mm. Here, p3'=20 mm.

The pitches p2' and p3' satisfy 0.36≤(p3'−p2')/p3'≤0.57. 0.38≤(p3'−p2')/p3'; for preference 0.40≤(p3'−p2')/p3'; more preferably 0.43≤(p3'−p2')/p3'; and more preferably still 0.45≤(p3'−p2')/p3'.

(p3'−p2')/p3'≤0.55 and for preference (p3'−p2')/p3'≤0.53. In this instance (p3'−p2')/p3'=0.50.

The intermediate layer C2' of each external strand TE is desaturated and incompletely unsaturated. The inter-wire distance I2' of the intermediate layer C2' which on average separates the M' intermediate wires is greater than or equal to 5 μm. The inter-wire distance I2' is preferably greater than or equal to 10 μm, more preferably greater than or equal to 20 μm and more preferably still greater than or equal to 30 μm. In this embodiment, the inter-wire distance I2' is preferably greater than or equal to 35 μm and is here equal to 35.4 μm. Because the intermediate layer C2' is incompletely unsaturated, the sum SI2' of the inter-wire distances I2' of the intermediate layer C2' is less than the diameter d2' of the intermediate wires F2' of the intermediate layer C2'. Here, the sum SI2'=6×0.0354=0.21 mm, which is a value strictly less than d2'=0.30 mm.

Furthermore, the sum SI2' of the inter-wire distances I2' of the intermediate layer C2' is less than the diameter d3' of the external wires F3' of the external layer C3' and preferably less than or equal to 0.8×d3'. Here, the sum SI2'=6× 0.0354=0.21 mm, which is a value strictly less than d3'=0.30 mm.

The external layer C3' of each external strand TE is desaturated and completely unsaturated. The inter-wire distance I3' of the external layer C3' which on average separates the N' external wires is greater than or equal to 5 μm. The inter-wire distance I3' is preferably greater than or equal to 10 μm, more preferably greater than or equal to 20 μm and more preferably still greater than or equal to 30 μm. In this embodiment, the inter-wire distance I3' is preferably greater than or equal to 35 μm and more preferably greater than or equal to 50 μm, and is here equal to 55.4 μm. The sum SI3' of the inter-wire distances I3' of the external layer C3' is greater than the diameter d3' of the external wires F3' of the external layer C3'. Here, the sum SI3'=11×0.0554=0.61 mm, which is a value strictly greater than d3'=0.30 mm.

Each internal, intermediate and external wire of each external strand TE respectively has a diameter d1', d2' and d3'. Each internal wire diameter d1', intermediate wire diameter d2' and external wire diameter d3' of the internal strand TI ranges from 0.15 mm to 0.60 mm, preferably from 0.20 mm to 0.50 mm, more preferably from 0.25 mm to 0.45 mm, and more preferably still from 0.28 mm to 0.42 mm.

The internal wire F1' of each external strand TE has a diameter d1' greater than or equal to the diameter d2' of each intermediate wire F2' of each external strand TE. The internal wire F1' of each external strand TE has a diameter d1' greater than or equal to the diameter d3' of each external wire F3' of each external strand TE. Each diameter d2' of each intermediate wire F2' of each external strand TE and each diameter d3' of each external wire F3' of each external strand TE are such that d2'=d3'.

In this instance, d1'>d2' and d1'>d3' and d1'=0.38 mm, d2'=d3'=0.30 mm.

Each internal wire F1 of the internal strand TI has a diameter d1 greater than or equal to the diameter d1' of each internal wire F1' of each external strand TE, for preference each internal wire F1 of the internal strand TI has a diameter d1 equal to the diameter d1' of each internal wire F1' of each external strand TE. Here, d1=d1'=0.38 mm.

Each internal wire F1 of the internal strand TI has a diameter d1 greater than or equal to the diameter d2' of each intermediate wire F2' of each external strand TE, for preference each internal wire F1 of the internal strand TI has a diameter d1 greater than the diameter d2' of each intermediate wire F2' of each external strand TE. Here, d1=0.38 mm>d2'=0.30 mm.

Each internal wire F1 of the internal strand TI has a diameter d1 greater than or equal to the diameter d3' of each external wire F3' of each external strand TE, for preference each internal wire F1 of the internal strand TI has a diameter d1 greater than the diameter d3' of each external wire F3' of each external strand TE. Here, d1=0.38 mm>d3'=0.30 mm.

Each intermediate wire F2 of the internal strand TI has a diameter d2 greater than or equal to the diameter d2' of each intermediate wire F2' of each external strand TE. For preference, here, d2=0.35 mm>d2'=0.30 mm.

Each external wire F3 of the internal strand TI has a diameter d3 greater than or equal to the diameter d3' of each external wire F3 of each external strand TE. For preference, here, d3=0.35 mm>d3'=0.30 mm.

Each wire has a breaking strength, denoted Rm, such that 2500≤Rm≤3100 MPa. The steel for these wires is said to be of SHT ("Super High Tensile") grade. Other wires may be used, for example wires of an inferior grade, for example of NT ("Normal Tensile") or HT ("High Tensile") grade, just as may wires of a superior grade, for example of UT ("Ultra Tensile") or MT ("Mega Tensile") grade.

Method for Manufacturing the Cord According to the Invention

The cord according to the invention is manufactured using a method comprising steps well known to those skilled in the art. Thus, it will be recalled that there are two possible techniques for assembling metal wires or strands:

- either by cabling: in which case the wires or strands undergo no twisting about their own axis, because of a synchronous rotation before and after the assembling point;
- or by twisting: in which case the wires or strands undergo both a collective twist and an individual twist about their own axis, thereby generating an untwisting torque on each of the wires or strands.

The aforementioned internal strand is manufactured according to known methods involving the following steps, preferably performed in line and continuously:

- first of all, a first step of assembling, by twisting or by cabling, the M intermediate wires around the Q internal wire(s) the internal layer C1 at the pitch p2 and in the Z-direction to form the intermediate layer C2 at a first assembling point;
- followed by a second step of assembling, by twisting or by cabling, the N external wires around the M intermediate wires of the intermediate layer C2 at the pitch p3 and in the Z-direction to form the external layer C3 at a second assembling point;
- preferably a final twist-balancing step.

A similar method is used to manufacture, mutatis mutandis, each external strand TE.

What is meant here by "twist balancing" is, as is well known to those skilled in the art, the cancellation of the residual torque (or the elastic return of the twist) applied to each wire of the strand, in the intermediate layer as in the external layer.

After this final twist-balancing step, the manufacture of the strand is complete. Each strand is wound onto one or more receiving reels, for storage, prior to the later operation of cabling together the elementary strands in order to obtain the multi-strand cord.

In order to manufacture the multi-strand cord of the invention, the method, as is well known to those skilled in the art, is to cable or twist together the strands previously obtained, using cabling or twisting machines rated for assembling strands.

Thus, the L external strands TE are assembled around the internal strand TI at the pitch p and in the S-direction to form the cord 50. Possibly, in a last assembly step, the wrapper F is wound, at the pitch pf and in the Z-direction, around the assembly previously obtained.

The cord is then incorporated by calendering into composite fabrics formed from a known composition based on natural rubber and carbon black as reinforcing filler, conventionally used for manufacturing crown reinforcements of radial tyres. This composition essentially contains, in addition to the elastomer and the reinforcing filler (carbon black), an antioxidant, stearic acid, an oil extender, cobalt naphthenate as adhesion promoter, and finally a vulcanization system (sulfur, accelerator and ZnO).

The composite fabrics reinforced by these cords have an elastomer compound matrix formed from two thin layers of elastomer compound which are superposed on either side of the cords and which have a thickness of between 1 and 4 mm, inclusive, respectively. The calendering pitch (the pitch at which the cords are laid in the elastomer compound fabric) ranges from 4 mm to 8 mm.

These composite fabrics are then used as working ply in the crown reinforcement during the method of manufacturing the tyre, the steps of which are otherwise known to a person skilled in the art.

Cord According to a Second Embodiment of the Invention

Figure 4:
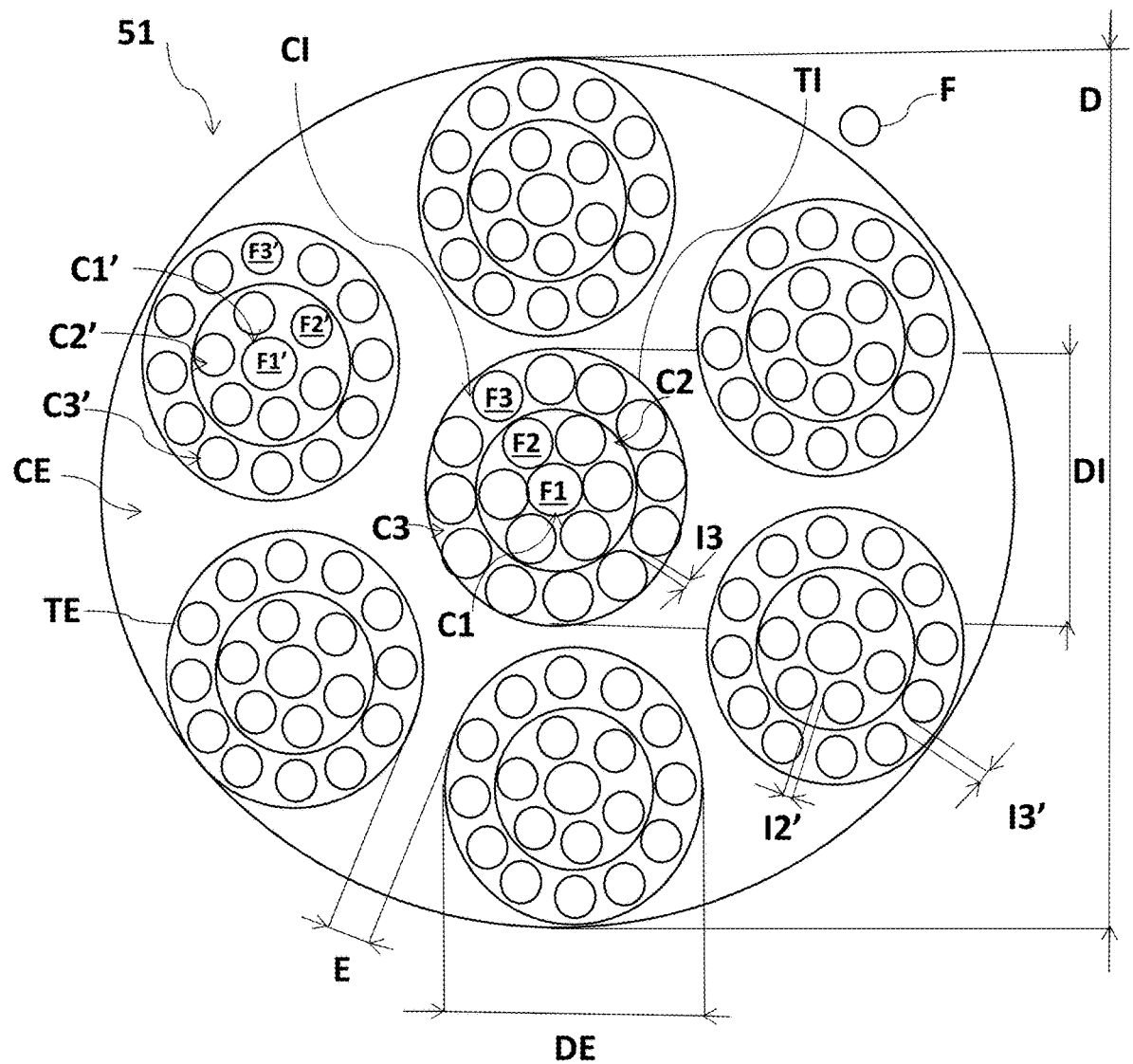
FIG. 4 is a view, similar to that of FIG. 3, of a $[(0.38+(6+12)\times0.35)+6\times(0.38+(6+12)\times0.30)]+0.28$ cord according to a second embodiment of the invention.

FIG. 4 depicts a cord 51 according to a second embodiment of the invention. Elements similar to those of the first embodiment are denoted by identical references. Unless mentioned otherwise, only the differences compared to the first embodiment are described.

Internal Strand TI of the Cord 51

Unlike in the first embodiment of the cord 50 described hereinabove, the internal strand of the cord 51 according to the second embodiment is such that Q=1, M=6 and N=12, and the external layer C3 of the internal strand TI is desaturated, in this case incompletely unsaturated. The inter-wire distance I3 of the external layer C3 which on average separates the N external wires is equal to 12 μm. The sum SI3 of the inter-wire distances I3 of the external layer C3 is less than the diameter d3 of the external wires F3 of the external layer C3. Here, the sum SI3=12×0.012=0.14 mm, which is a value strictly less than d3=0.35 mm.

External Strands TE of the Cord 51

Unlike in the first embodiment of the cord 50 described hereinabove, each external strand of the cord 51 according to the second embodiment is such that Q'=1, M'=6 and N'=12.

In a way similar to the first embodiment of the invention, the external layer C3' of each external strand TE is desaturated, in this case completely unsaturated. The inter-wire distance I3' of the external layer C3' which on average separates the N' external wires is equal to 25.7 μm. The sum SI3' of the inter-wire distances I3' of the external layer C3' is greater than the diameter d3' of the external wires F3' of the external layer C3'. Here, the sum SI3'=12×0.0257=0.31 mm, which is a value strictly greater than d3'=0.30 mm.

According to the invention, the pitches p2'=10 mm and p3'=20 mm satisfy 0.36≤(p3'−p2')/p3'≤0.57. In this instance (p3'−p2')/p3'=0.50.

Cord According to a Third Embodiment of the Invention

Figure 5:
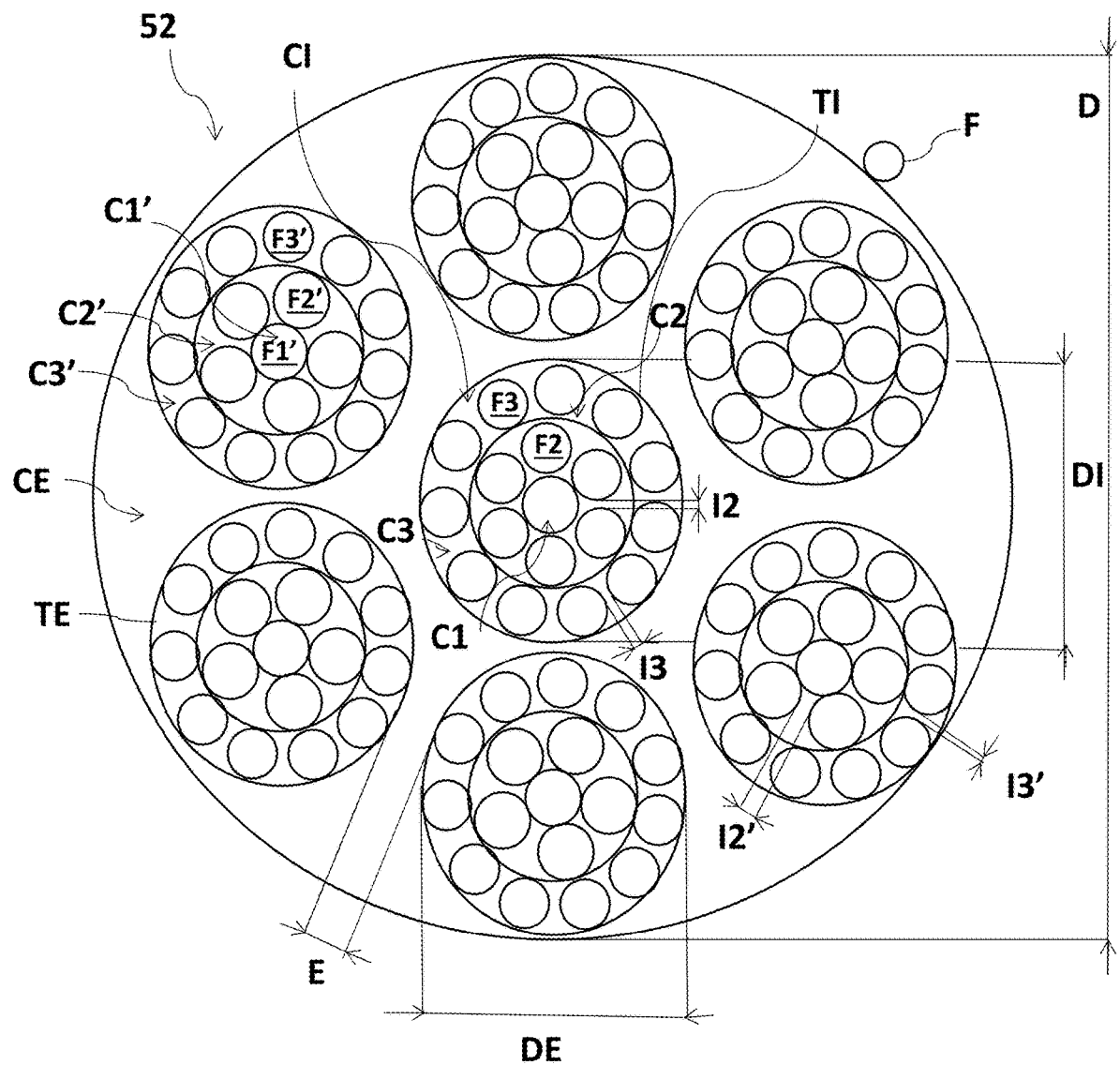
FIG. 5 is a view, similar to that of FIG. 3, of a $[(0.38+(6+11)\times0.35)+6\times(0.35+(5\times0.35+11\times0.30)]+0.28$ cord according to a third embodiment of the invention.

FIG. 5 depicts a cord 52 according to a third embodiment of the invention. Elements similar to those of the first embodiment are denoted by identical references. Unless mentioned otherwise, only the differences compared to the first embodiment are described.

Unlike in the first embodiment of the cord 50 described hereinabove, the cord 52 according to the third embodiment is such that D=5.1 mm.

The diameter DI of the internal strand TI and the diameter DE of each external strand TE are such that DI=1.78 mm, DE=1.650 mm and DI/DE=1.07.

The mean inter-strand distance E separating two adjacent external strands TE is here E=50.6 μm.

Internal Strand TI of the Cord 52

The internal strand of the cord 52 according to the third embodiment is identical to the internal strand of the cord 50 according to the first embodiment.

External Strands TE of the Cord 52

Unlike in the first embodiment of the cord 50 described hereinabove, each external strand TE of the cord 52 according to the third embodiment is such that Q'=1, M'=5 and N'=11.

According to the invention, the pitches p2' and p3' satisfy $0.36 \leq (p3'-p2')/p3' \leq 0.57$. In this instance $(p3'-p2')/p3'=0.50$.

In a way similar to the first embodiment of the invention, the intermediate layer C2' of each external strand TE is desaturated and incompletely unsaturated. The inter-wire distance I2' of the intermediate layer C2' which on average separates the M' intermediate wires is equal to 57.5 µm.

The sum SI2' of the inter-wire distances I2' of the intermediate layer C2' is less than the diameter d3' of the external wires F3' of the external layer C3' and preferably less than or equal to 0.8×d3'. Here, the sum SI2'=5×0.0575=0.29 mm, which is a value strictly less than d3'=0.30 mm.

In a way similar to the first embodiment of the invention, the external layer C3' of each external strand TE is desaturated and completely unsaturated. The inter-wire distance I3' of the external layer C3' which on average separates the N' external wires is equal to 74.7 µm. The sum SI3' of the inter-wire distances I3' of the external layer C3' is greater than the diameter d3' of the external wires F3' of the external layer C3'. Here, the sum SI3'=11×0.0747=0.82 mm, which is a value strictly greater than d3'=0.30 mm.

The internal wire F1' of each external strand TE has a diameter d1' equal to the diameter d2' of each intermediate wire F2' of each external strand TE. The internal wire F1' of each external strand TE has a diameter d1' greater than the diameter d3' of each external wire F3' of each external strand TE. Each diameter d2' of each intermediate wire F2' of each external strand TE and each diameter d3' of each external wire F3' of each external strand TE are such that d2'>d3'.

In this instance, d1'=d2'>d3' and d1'=d2'=0.35 mm, and d3'=0.30 mm.

Each intermediate wire F2 of the internal strand TI has a diameter d2 equal to the diameter d2' of each intermediate wire F2' of each external strand TE. For preference, here, d2=d2'=0.35 mm.

Unlike in the cord 50 according to the first embodiment, each internal wire F1 of the internal strand TI of the cord 52 according to the third embodiment has a diameter d1 greater than or equal to the diameter d1' of each internal wire F1' of each external strand TE. Here, each internal wire F1 of the internal strand TI has a diameter d1 greater than the diameter d1' of each internal wire F1' of each external strand TE. Here, d1=0.38 mm>d1'=0.35 mm.

In addition, d1=0.38 mm>d2'=0.35 mm.

In a way similar to the cord 50 according to the first embodiment, d1=0.38 mm>d3'=0.30 mm.

Cord According to a Fourth Embodiment of the Invention

Figure 6:
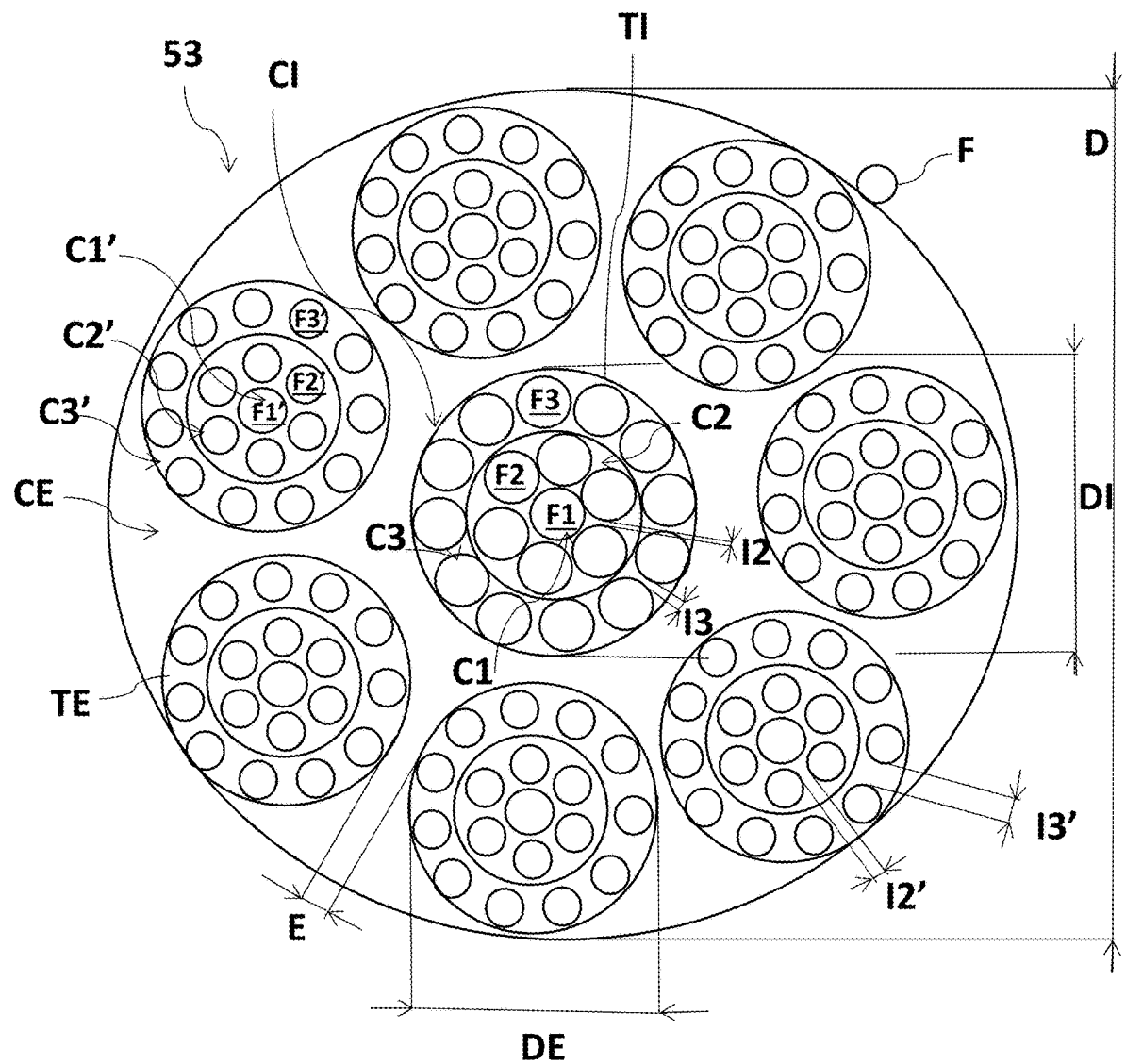
FIG. 6 is a view, similar to that of FIG. 3, of a $[(1+6+12)\times0.40+7\times(0.32+(6+11)\times0.26)]+0.28$ cord according to a fourth embodiment of the invention.

FIG. 6 depicts a cord 53 according to a fourth embodiment of the invention. Elements similar to those of the first embodiment are denoted by identical references. Unless mentioned otherwise, only the differences compared to the first embodiment are described.

Unlike in the first embodiment of the cord 50 described hereinabove, the cord 53 according to the fourth embodiment is such that the external layer CE is made up of L=7 external strands TE. The assembly made up of the internal CI and external CE layers, which means to say the cord 53 without the wrapper F, has a diameter D=4.7 mm.

The diameter DI of the internal strand TI and the diameter DE of each external strand TE are such that the ratio $DI/DE \geq 1.30$, for preference $DI/DE \geq 1.35$ and more preferably $DI/DE \geq 1.40$. This ratio DI/DE is also such that $DI/DE \leq 1.70$, for preference $DI/DE \leq 1.65$ and more preferably $DI/DE \leq 1.60$. In this case, DI=2.01 mm, DE=1.36 mm and DI/DE=1.48.

The mean inter-strand distance E separating two adjacent external strands TE is here E=90.1 µm.

Internal Strand TI of the Cord 53

Unlike in the first embodiment of the cord 50 described hereinabove, the internal strand TI of the cord 53 according to the fourth embodiment is such that Q=1, M=5 or 6 and N=10, 11 or 12 and preferably here Q=1, M=6 and N=12.

Unlike in the first embodiment of the cord 50 described hereinabove, the intermediate layer C2 of the internal strand TI is saturated. The inter-wire distance I2 of the intermediate layer C2 which on average separates the M intermediate wires is equal to 0 µm.

Unlike in the first embodiment of the cord 50 described hereinabove, the inter-wire distance I3 of the external layer C3 which on average separates the N external wires is less than 5 µm. Here, it is equal to 4.9 µm.

Unlike in the first embodiment, each internal wire F1, intermediate wire F2 and external wire F3 has the same diameter so that d1=d2=d3 and is here equal to 0.40 mm.

External Strands TE of the Cord 53

Unlike in the first embodiment of the cord 50 described hereinabove, each external strand TE of the cord 53 according to the fourth embodiment is such that d1'=0.32 mm, d2'=d3'=0.26 mm.

According to the invention, the pitches p2'=10 mm and p3'=20 mm satisfy $0.36 \leq (p3'-p2')/p3' \leq 0.57$. In this instance $(p3'-p2')/p3'=0.50$.

In a way similar to the first embodiment of the invention, the intermediate layer C2' of each external strand TE is desaturated and incompletely unsaturated. The inter-wire distance I2' of the intermediate layer C2' which on average separates the M' intermediate wires is equal to 27.1 µm.

The sum SI2' of the inter-wire distances I2' of the intermediate layer C2' is less than the diameter d3' of the external wires F3' of the external layer C3' and preferably less than or equal to 0.8×d3'. Here, the sum SI2'=6×0.0271=0.16 mm, which is a value strictly less than d3'=0.26 mm.

In a way similar to the first embodiment of the invention, the external layer C3' of each external strand TE is desaturated and completely unsaturated. The inter-wire distance I3' of the external layer C3' which on average separates the N' external wires is equal to 46.6 µm. The sum SI3' of the inter-wire distances I3' of the external layer C3' is greater than the diameter d3' of the external wires F3' of the external layer C3'. Here, the sum SI3'=11×0.0466=0.51 mm, which is a value strictly greater than d3'=0.26 mm.

Unlike in the first embodiment, d1=0.40 mm>d1'=0.32 mm. In addition, d1=0.40 mm>d2'=d3'=0.26 mm. Also, d2=0.40 mm>d2'=0.26 mm and d3=0.40 mm>d3'=0.26 mm.

Cord According to a Fifth Embodiment of the Invention

Figure 7:
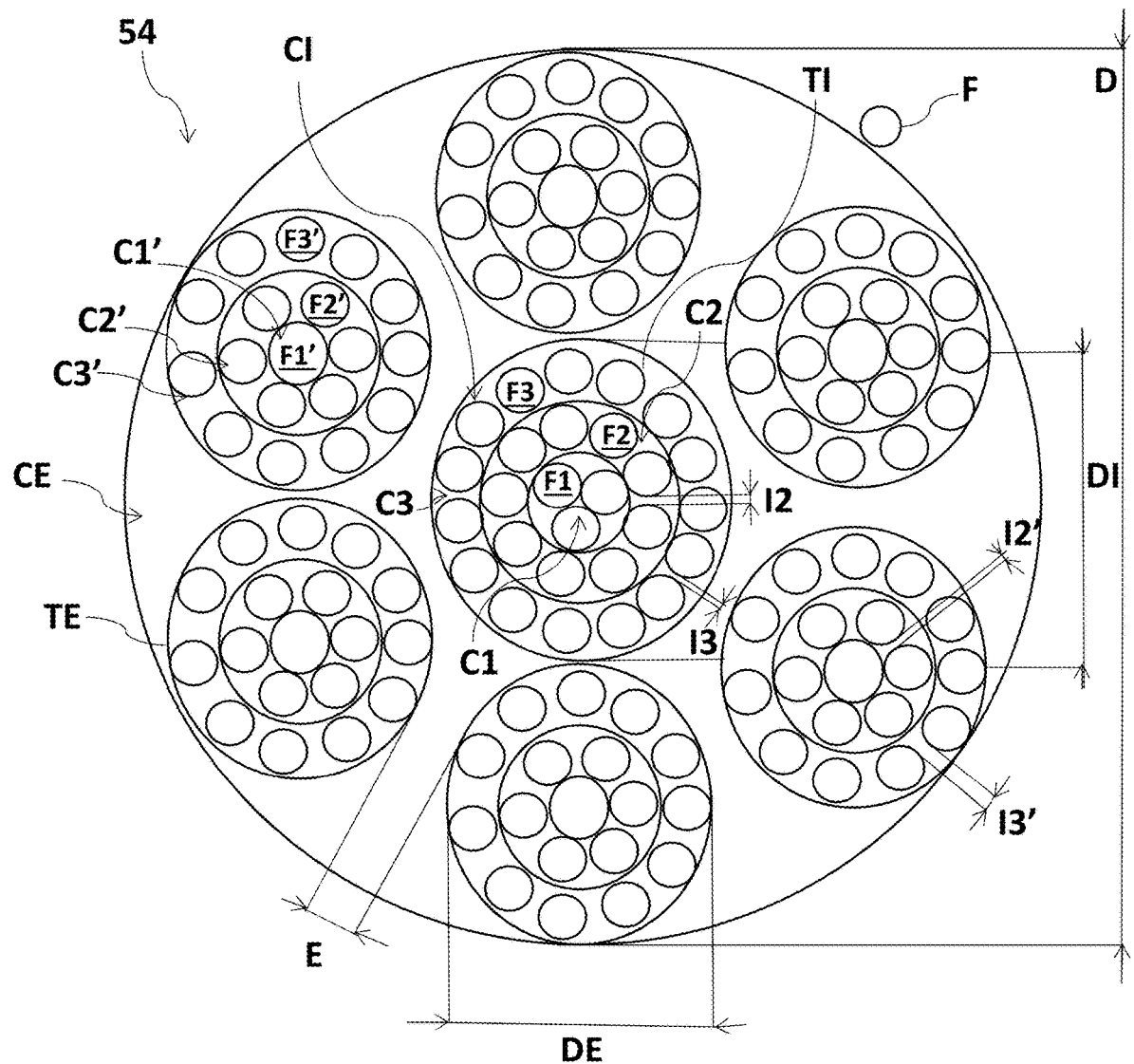
FIG. 7 is a view, similar to that of FIG. 3, of a $[(3+9+15)\times0.38+6\times(0.45+(6+11)\times0.38)]+0.28$ cord according to a fifth embodiment of the invention.

FIG. 7 depicts a cord 54 according to a fifth embodiment of the invention. Elements similar to those of the first embodiment are denoted by identical references. Unless mentioned otherwise, only the differences compared to the first embodiment are described.

Unlike in the first embodiment of the cord 50 described hereinabove, the cord 54 according to the fifth embodiment is such that D=6.3 mm.

The diameter DI of the internal strand TI and the diameter DE of each external strand TE are such that DI=2.340 mm, DE=1.970 mm and DI/DE=1.19.

The mean inter-strand distance E separating two adjacent external strands TE is here E=160 µm.

Internal Strand TI of the Cord 54

Unlike in the first embodiment of the cord 50 described hereinabove, the internal strand TI of the cord 54 according to the fifth embodiment is such that Q=1, 2, 3 or 4, for preference Q=1, 2 or 3 and more preferably here Q=3.

Q=3, M=8 or 9 and N=13, 14 or 15, for preference Q=3, M=8 or 9, N=14 or 15, more preferably Q=3, M=9, N=14 or 15 and more preferably still here Q=3, M=9 and N=15.

The internal layer C1 of the internal strand TI is wound in a direction of winding Z that is the opposite to the direction of winding S of the cord. As an alternative, this direction could be identical to the direction to the direction of winding S of the cord. The Q internal wires F1 are wound in a helix with a pitch p1 such that 5 mm≤p1≤10 mm. Here, p1=6.5 mm.

Unlike in the first embodiment, the M intermediate wires F2 are wound in a helix around the internal wires F1 at a pitch p2=12 mm and the N external wires F3 are wound in a helix around the intermediate wires F2 at a pitch p3=18 mm.

In a way similar to the first embodiment of the cord 50 described hereinabove, the intermediate layer C2 of the internal strand TI is desaturated and completely unsaturated. The inter-wire distance I2 of the intermediate layer C2 which on average separates the M intermediate wires is equal to 14.6 μm. The sum SI2 of the inter-wire distances I2 of the intermediate layer C2 is less than the diameter d3 of the external wires F3 of the external layer C3 and preferably less than or equal to 0.8×d3. Here, the sum SI2=9× 0.0146=0.13 mm, which is a value strictly less than d3=0.38 mm.

Unlike in the first embodiment of the cord 50 described hereinabove, the inter-wire distance I3 of the external layer C3 which on average separates the N external wires is equal to 7 μm.

Unlike in the first embodiment, each internal wire F1, intermediate wire F2 and external wire F3 has the same diameter so that d1=d2=d3 and is here equal to 0.38 mm.

External Strands TE of the Cord 54

Unlike in the first embodiment of the cord 50 described hereinabove, each external strand TE of the cord 54 according to the fifth embodiment is such that d1'=0.45 mm, d2'=d3'=0.38 mm.

According to the invention, the pitches p2'=10 mm and p3'=20 mm satisfy 0.36≤(p3'−p2')/p3'≤0.57. In this instance (p3'−p2')/p3'=0.50.

In a way similar to the first embodiment of the invention, the intermediate layer C2' of each external strand TE is desaturated and incompletely unsaturated. The inter-wire distance I2' of the intermediate layer C2' which on average separates the M' intermediate wires is equal to 25.7 μm.

The sum SI2' of the inter-wire distances I2' of the intermediate layer C2' is less than the diameter d3' of the external wires F3' of the external layer C3' and preferably less than or equal to 0.8×d3'. Here, the sum SI2'=6×0.0257=0.15 mm, which is a value strictly less than d3'=0.38 mm.

In a way similar to the first embodiment of the invention, the external layer C3' of each external strand TE is desaturated and completely unsaturated. The inter-wire distance I3' of the external layer C3' which on average separates the N' external wires is equal to 57.5 μm. The sum SI3' of the inter-wire distances I3' of the external layer C3' is greater than the diameter d3' of the external wires F3' of the external layer C3'. Here, the sum SI3'=11×0.0575=0.63 mm, which is a value strictly greater than d3'=0.38 mm.

Unlike in the first embodiment of the cord 50 described hereinabove, the cord 54 according to the fifth embodiment is such that:

each intermediate wire F2 of the internal strand TI has a diameter d2 equal to the diameter d2' of each intermediate wire F2' of each external strand TE. Here, d2=d2'=0.38 mm, and each external wire F3 of the internal strand TI has a diameter d3 equal to the diameter d3' of each external wire F3' of each external strand TE. Here, d3=d3'=0.38 mm.

Unlike in the first embodiment, d1=0.38 mm<d1'=0.45 mm. In addition, d1=d2=d3=d2'=d3'=0.38 mm.

Cord According to a Sixth Embodiment of the Invention

Figure 8:
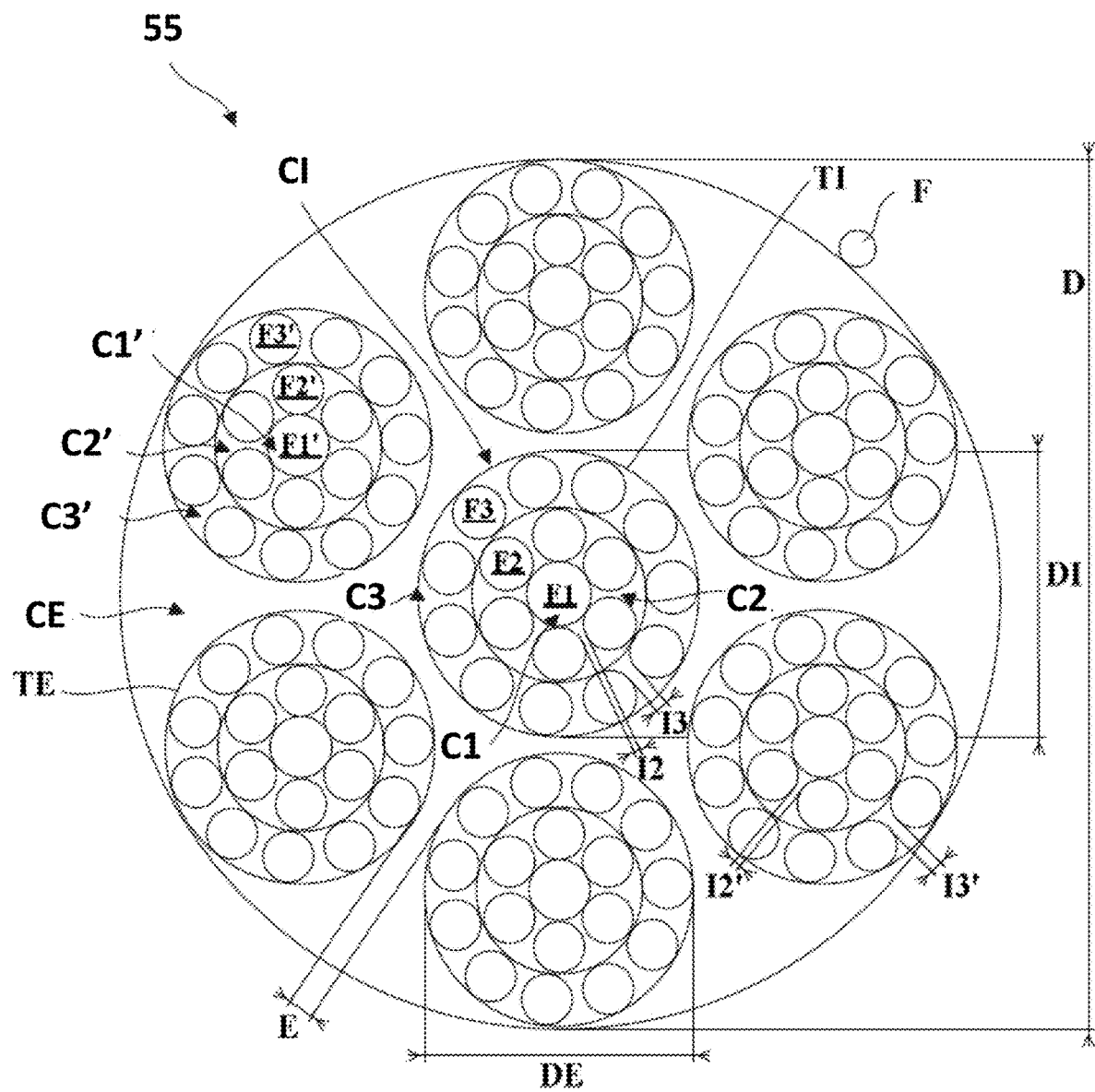
FIG. 8 is a view, similar to that of FIG. 3, of a $[(0.38+(6+11)\times0.35)+6\times(0.38+(6+11)\times0.30)]+0.28$ cord according to a sixth embodiment of the invention.

FIG. 8 depicts a cord 55 according to a sixth embodiment of the invention. Elements similar to those of the first embodiment are denoted by identical references. Unless mentioned otherwise, only the differences compared to the first embodiment are described. The cord 55 according to the sixth embodiment differs from the cord 50 according to the first embodiment in terms of its internal strand TI.

Internal Strand TI of the Cord 55

Unlike in the first embodiment of the cord 50 described hereinabove, the internal strand TI of the cord 55 according to the sixth embodiment is such that the pitches p2 and p3 satisfy 0.36≤(p3−p2)/p3≤0.57. Advantageously, the pitches p2 and p3 satisfy the relationship 0.38≤(p3−p2)/p3; for preference 0.40≤(p3−p2)/p3; more preferably 0.43≤(p3−p2)/p3; and more preferably still 0.45≤(p3−p2)/p3. Advantageously, the pitches p2 and p3 also satisfy the relationship (p3−p2)/p3≤0.55 and for preference (p3−p2)/p3≤0.53.

Such a pitch p2 is such that 8 mm≤p2≤16 mm, for preference 8 mm≤p2≤14 mm and more preferably 8 mm≤p2≤12 mm; here p2=10 mm.

Such a pitch p3 is such that 10 mm≤p3≤40 mm, for preference 15 mm≤p3≤35 mm and more preferably 15 mm≤p3≤25 mm; here p3=20 mm.

Unlike in the first embodiment of the cord 50 described hereinabove, the inter-wire distance I2 of the intermediate layer C2 which on average separates the M intermediate wires is equal to 8.2 μm.

In a way similar to the first embodiment of the invention, the external layer C3 of the internal strand is desaturated and completely unsaturated. The inter-wire distance I3 of the external layer C3 which on average separates the N external wires is equal to 45 μm. The sum SI3 of the inter-wire distances I3 of the external layer C3 is greater than the diameter d3 of the external wires F3 of the external layer C3. Here, the sum SI3=11×0.045=0.5 mm, which is a value strictly greater than d3=0.35 mm.

External Strands TE of the Cord 55

According to the invention, and as in the first embodiment, the pitches p2'=10 mm and p3'=20 mm satisfy the relationship 0.36≤(p3'−p2')/p3'≤0.57. In this instance (p3'−p2')/p3'=0.50.

Cord According to a Seventh Embodiment of the Invention

Figure 9:
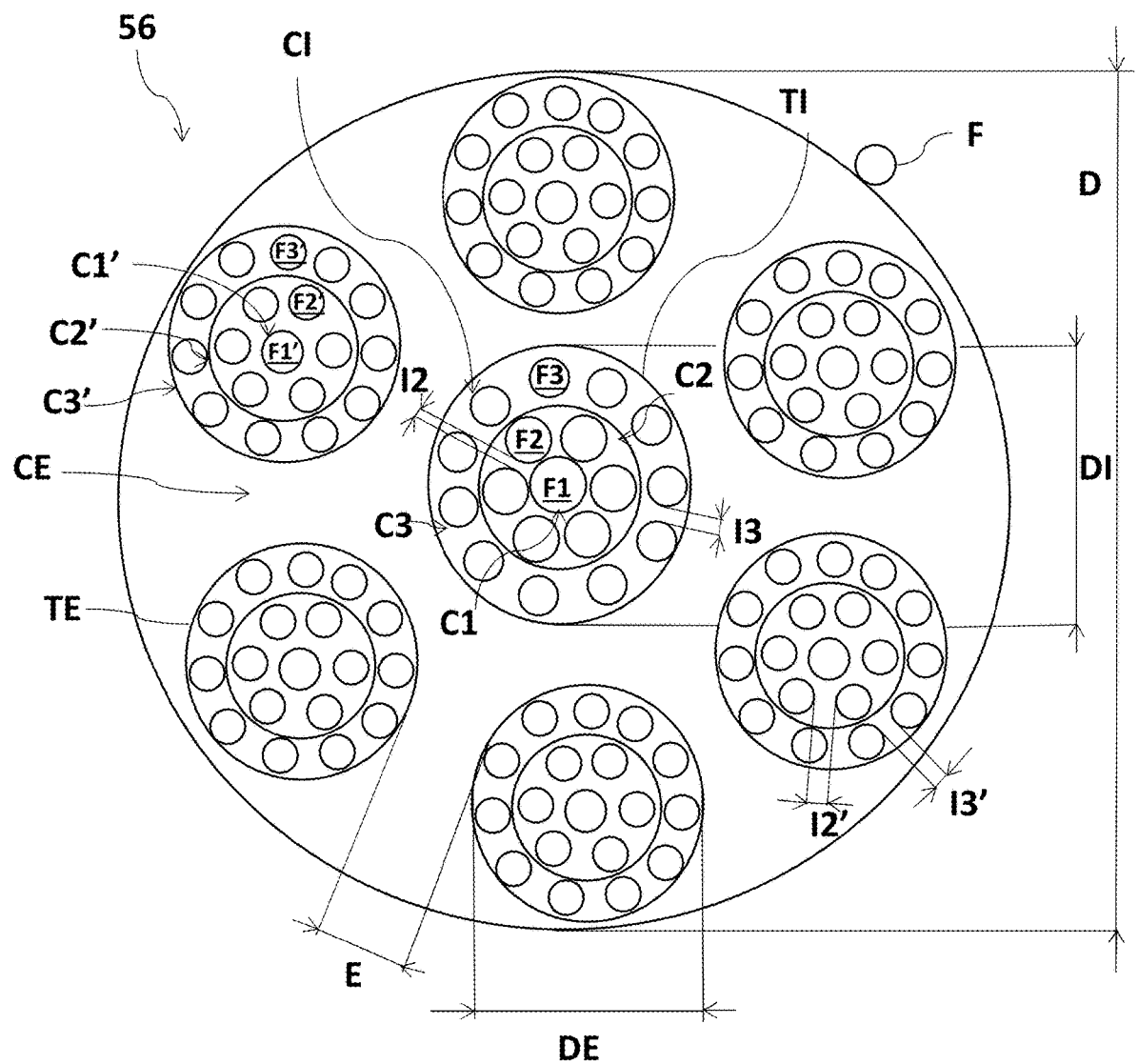
FIG. 9 is a view, similar to that of FIG. 3, of a $[(0.60+6\times0.50+11\times0.45)+6\times(0.45+(6+11)\times0.38)]+0.28$ cord according to a seventh embodiment of the invention.

FIG. 9 depicts a cord 56 according to a seventh embodiment of the invention. Elements similar to those of the first embodiment are denoted by identical references. Unless mentioned otherwise, only the differences compared to the first embodiment are described.

Unlike in the first embodiment of the cord 50 described hereinabove, the cord 56 according to the seventh embodiment is such that D=6.4 mm.

The diameter DI of the internal strand TI and the diameter DE of each external strand TE are such that DI=2.5 mm, DE=1.97 mm and DI/DE=1.27.

The mean inter-strand distance E separating two adjacent external strands TE is here E=238.9 μm.

Internal Strand TI of the Cord 56

Unlike in the first embodiment of the cord 50 described hereinabove, the internal strand TI of the cord 56 according to the seventh embodiment is such that d1>d2>d3 and here d1=0.60 mm, d2=0.50 mm, and d3=0.45 mm.

In a way similar to the first embodiment of the invention, the intermediate layer C2 of the internal strand TI is desaturated and incompletely unsaturated. The inter-wire distance I2 of the intermediate layer C2 which on average separates the M intermediate wires is equal to 39.1 μm. The sum SI2 of the inter-wire distances I2 of the intermediate layer C2 is less than the diameter d3 of the external wires F3 of the external layer C3 and preferably less than or equal to 0.8×d3. Here, the sum SI2=6×0.0391=0.23 mm, which is a value strictly less than d3=0.45 mm.

In a way similar to the first embodiment of the invention, the external layer C3 of the internal strand TI is desaturated and completely unsaturated. The inter-wire distance I3 of the external layer C3 which on average separates the N external wires is equal to 107.2 μm. The sum SI3 of the inter-wire distances I3 of the external layer C3 is greater than the diameter d3 of the external wires F3 of the external layer C3. Here, the sum SI3=11×0.1072=1.18 mm, which is a value strictly greater than d3=0.45 mm.

External Strands TE of the Cord 56

Unlike in the first embodiment of the cord 50 described hereinabove, each external strand TE of the cord 56 according to the seventh embodiment is such that the M intermediate wires F2' are wound in a helix around the internal wire F1' at a pitch p2' such that 8 mm≤p2'≤16 mm, for preference 8 mm≤p2'≤14 mm. Here p2'=12.5 mm. The N external wires F3' are wound in a helix around the intermediate wires F2' at a pitch p3'=25 mm.

According to the invention, the pitches p2' and p3' satisfy 0.36≤(p3'−p2')/p3'≤0.57. In this instance (p3'−p2')/p3'=0.50.

Unlike in the first embodiment, d1'=0.45 mm, d2'=d3'=0.38 mm.

In a way similar to the first embodiment of the invention, the intermediate layer C2' of each external strand TE is desaturated and incompletely unsaturated. The inter-wire distance I2' of the intermediate layer C2' which on average separates the M' intermediate wires is equal to 29.1 μm.

The sum SI2' of the inter-wire distances I2' of the intermediate layer C2' is less than the diameter d3' of the external wires F3' of the external layer C3' and preferably less than or equal to 0.8×d3'. Here, the sum SI2'=6×0.0291=0.17 mm, which is a value strictly less than d3'=0.38 mm.

In a way similar to the first embodiment of the invention, the external layer C3' of each external strand TE is desaturated and completely unsaturated. The inter-wire distance I3' of the external layer C3' which on average separates the N' external wires is equal to 61.3 μm. The sum SI3' of the inter-wire distances I3' of the external layer C3' is greater than the diameter d3' of the external wires F3' of the external layer C3'. Here, the sum SI3'=11×0.0613=0.67 mm, which is a value strictly greater than d3'=0.38 mm.

Just as in the first embodiment of the cord 50 described hereinabove, each intermediate wire F2 of the internal strand TI has a diameter d2 greater than or equal to the diameter d2' of each intermediate wire F2' of each external strand TE. For preference, here, d2=0.50 mm>d2'=0.38 mm. Likewise, each external wire F3 of the internal strand TI has a diameter d3 greater than or equal to the diameter d3' of each external wire F3 of each external strand TE. For preference, here, d3=0.45 mm>d3'=0.38 mm.

Unlike in the first embodiment, d1=0.60 mm>d1'=0.45 mm. In addition, d1=0.60 mm>d2'=d3'=0.38 mm. Also, d2=0.50 mm>d2'=0.38 mm and d3=0.45 mm>d3'=0.38 mm.

Cord According to an Eighth Embodiment of the Invention

Figure 10:
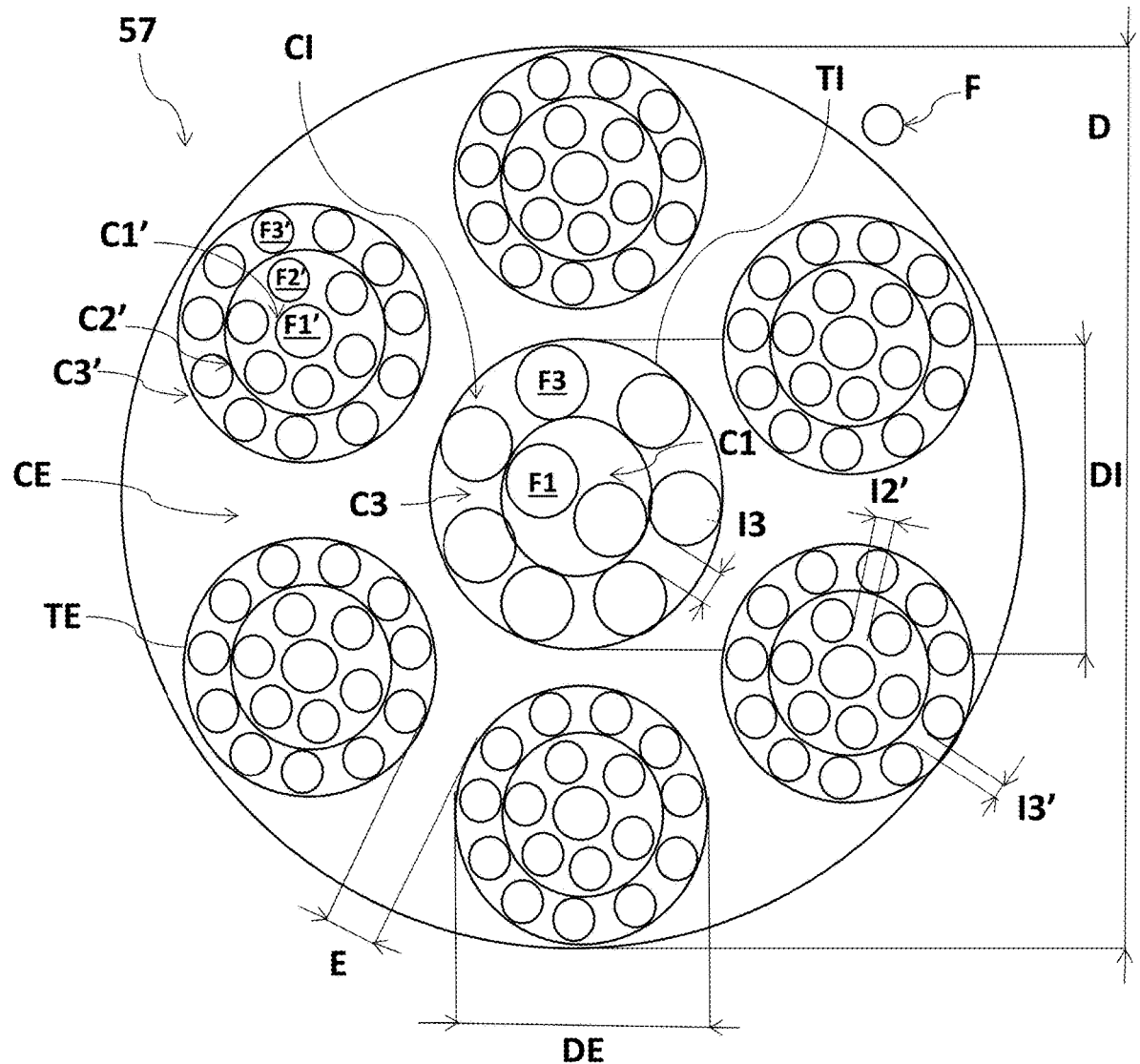
FIG. 10 is a view, similar to that of FIG. 3, of a $[(2+7)\times0.45+6\times(0.38+(6+11)\times0.30)]+0.28$ cord according to an eighth embodiment of the invention.

FIG. 10 depicts a cord 57 according to an eighth embodiment of the invention. Elements similar to those of the first embodiment are denoted by identical references. Unless mentioned otherwise, only the differences compared to the first embodiment are described. The cord 57 according to the eighth embodiment differs from the cord 50 according to the first embodiment in terms of its internal strand TI.

Unlike in the first embodiment of the cord 50 described hereinabove, the cord 57 according to the eighth embodiment is such that D=4.96 mm.

The diameter DI of the internal strand TI is such that DI=1.8 mm and DI/DE=1.14.

The mean inter-strand distance E separating two adjacent external strands TE is here E=97.3 μm.

Internal Strand TI of the Cord 57

Unlike in the first embodiment of the cord 50 described hereinabove, the internal strand TI has two layers. The internal strand TI comprises, in this instance is made up of, two layers, not more, not less.

The internal strand TI comprises an internal layer C1 made up of Q internal wire(s) F1 and an external layer C3 made up of N external wires F3 wound in a helix around and in contact with the internal layer C1.

Q>1, for preference Q=2, 3 or 4 and here Q=2. Where Q=2, N=7 or 8, and for preference Q=2 and N=7.

The internal wires F1 are wound in a helix at a pitch p1=7.7 mm.

The internal layer C1 of the internal strand TI is wound in a helix in a direction of winding Z that is the opposite to the direction of winding of the cord S.

The external layer C3 of the internal strand TI is wound around the internal layer C1 of the internal strand TI in a direction of winding Z that is the opposite to the direction of winding of the cord S and in the same direction Z as the internal layer C1 of the internal strand TI. The N external wires F3 are wound in a helix around the internal wires F1 with a pitch p3 such that 10 mm≤p3≤40 mm, for preference 15 mm≤p3≤35 mm, and more preferably still 15 mm≤p3≤25 mm. Here p3=15.4 mm.

The external layer C3 of the internal strand TI is desaturated and completely unsaturated. The inter-wire distance I3 of the external layer C3 which on average separates the N external wires is equal to 124.2 μm. The sum SI3 of the inter-wire distances I3 of the external layer C3 is greater than the diameter d3 of the external wires F3 of the external layer C3. Here, the sum SI3=7×0.1242=0.87 mm, which is a value strictly greater than d3=0.45 mm.

Each internal wire F1 of the internal strand TI has a diameter d1 greater than or equal to the diameter d3 of each external wire F3 of the internal strand TI. In this instance, d1=d3=0.45 mm.

Each internal wire F1 of the internal strand TI has a diameter d1 greater than or equal to the diameter d2' of each intermediate wire F2' of each external strand TE, here each internal wire F1 of the internal strand TI has a diameter d1=0.45 mm greater than the diameter d2'=0.30 mm of each intermediate wire F2' of each external strand TE and greater than the diameter d3'=0.30 mm of each external wire F3' of each external strand TE.

Each external wire F3 of the internal strand TI has a diameter d3 greater than or equal to the diameter d3' of each external wire F3 of each external strand TE, here each external wire F3 of the internal strand TI has a diameter d3=0.45 mm greater than the diameter d3'=0.30 mm of each external wire F3' of each external strand TE.

External Strands TE of the Cord 57

According to the invention, and as in the first embodiment, the pitches p2'=10 mm and p3'=20 mm satisfy the relationship 0.36≤(p3'−p2')/p3'≤0.57. In this instance (p3'−p2')/p3'=0.50.

Cord According to a Ninth Embodiment of the Invention

Figure 11:
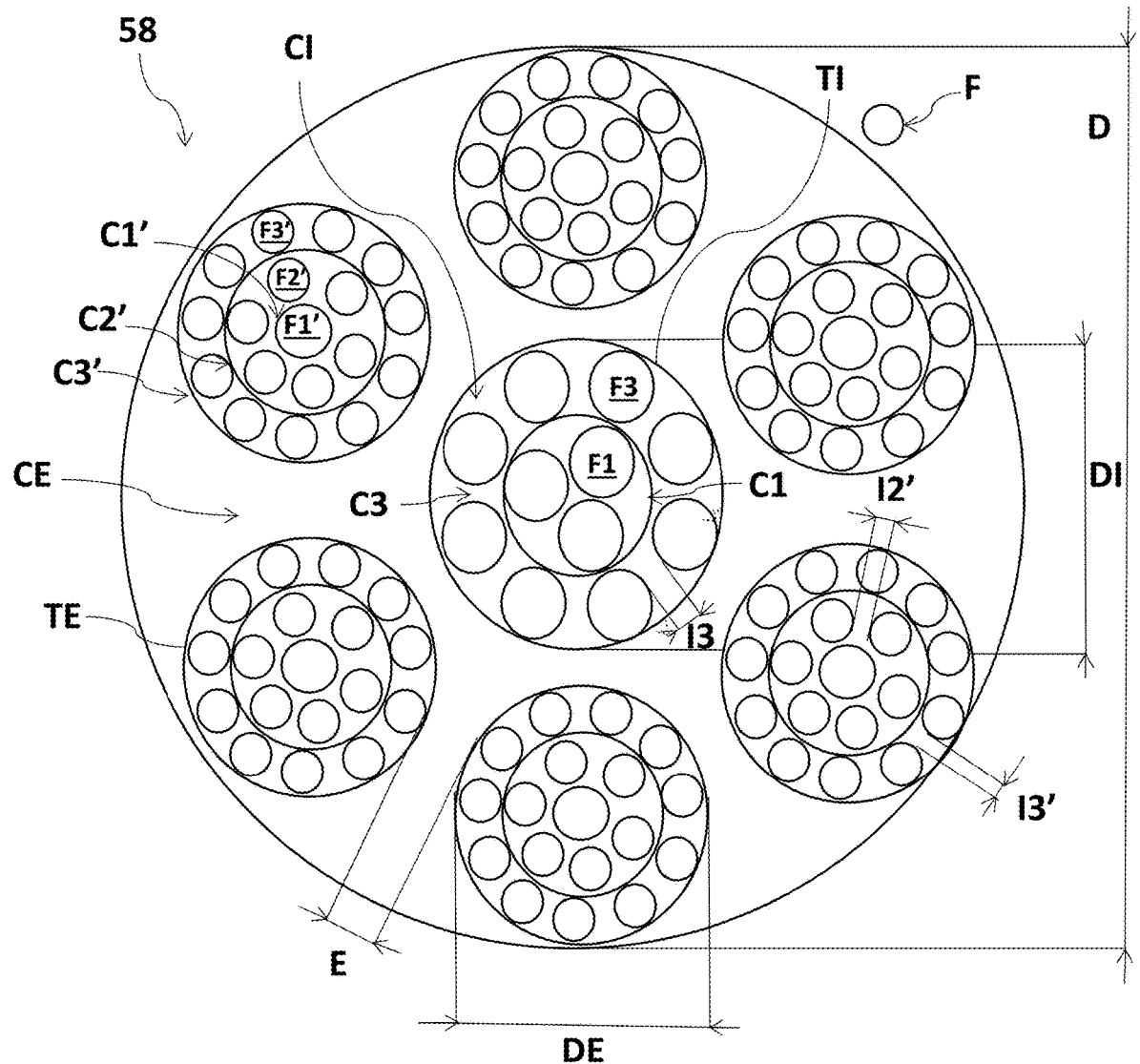
FIG. 11 is a view, similar to that of FIG. 3, of a $[(3+8)\times0.42+6\times(0.38+(6+11)\times0.30)]+0.28$ cord according to a ninth embodiment of the invention.

FIG. 11 depicts a cord 58 according to a ninth embodiment of the invention. Elements similar to those of the eighth embodiment are denoted by identical references. Unless mentioned otherwise, only the differences compared to the eighth embodiment are described. The cord 58 according to the ninth embodiment differs from the cord 57 according to the eighth embodiment in terms of its internal strand TI.

Unlike in the eighth embodiment described hereinabove, the cord 58 according to the ninth embodiment is such that D=4.91 mm.

The diameter DI of the internal strand TI is such that DI=1.75 mm and DI/DE=1.14.

The mean inter-strand distance E separating two adjacent external strands TE is here E=71 μm.

Internal Strand TI of the Cord 58

Unlike in the eighth embodiment, Q=3, N=7, 8 or 9 and here Q=3 and N=8. In addition, d1=d3=0.42 mm.

The external layer C3 of the internal strand TI is desaturated and completely unsaturated. The inter-wire distance I3 of the external layer C3 which on average separates the N external wires is equal to 75.8 μm. The sum SI3 of the inter-wire distances I3 of the external layer C3 is greater than the diameter d3 of the external wires F3 of the external layer C3. Here, the sum SI3=8×0.0758=0.61 mm, which is a value strictly greater than d3=0.42 mm.

External Strands TE of the Cord 58

According to the invention, and as in the eighth embodiment, the pitches p2'=10 mm and p3'=20 mm satisfy the relationship 0.36≤(p3'−p2')/p3'≤0.57. In this instance (p3'−p2')/p3'=0.50.

Cord According to a Tenth Embodiment of the Invention

Figure 12:
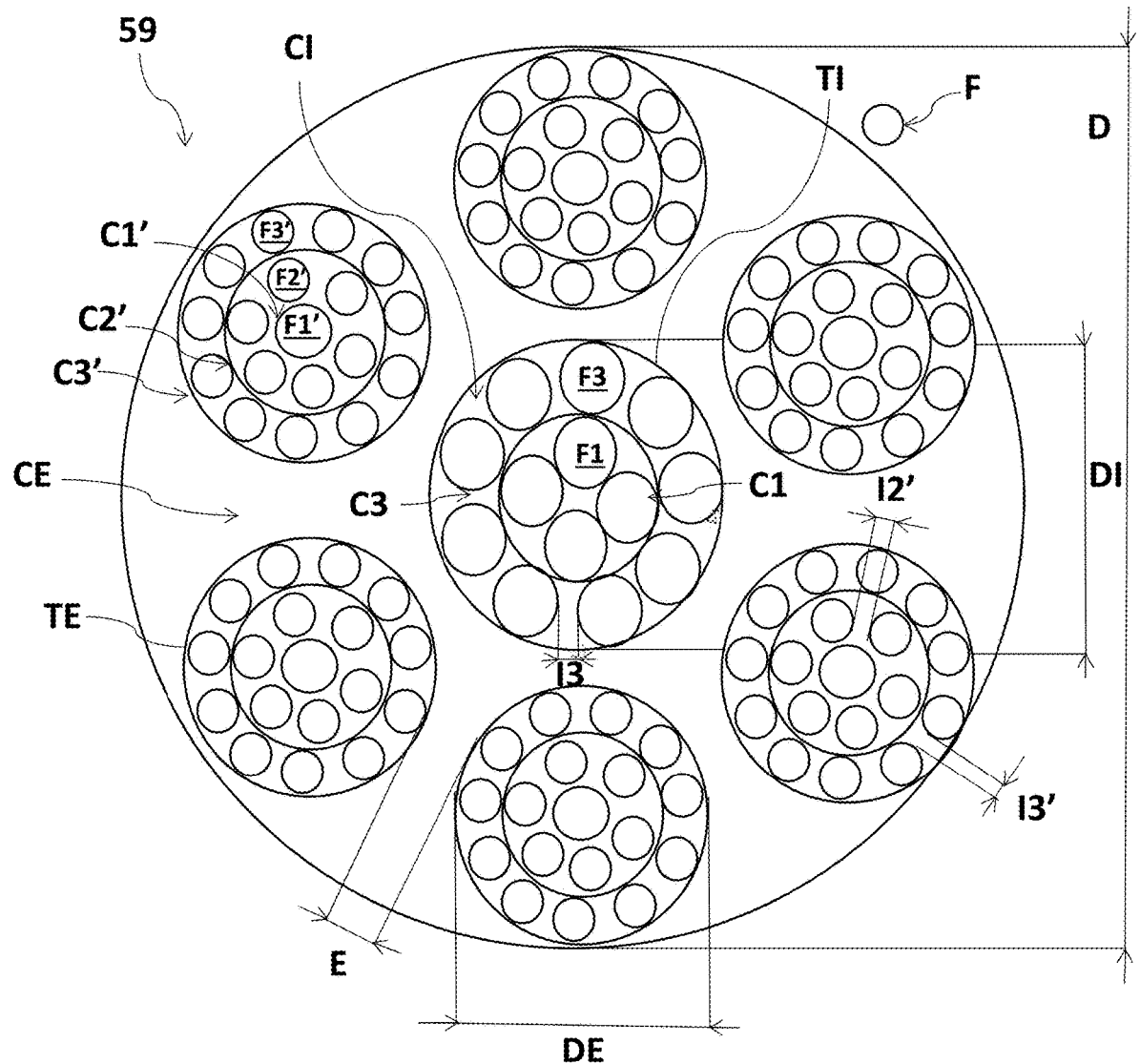
FIG. 12 is a view, similar to that of FIG. 3, of a $[(4+9)\times0.40+6\times(0.38+(6+11)\times0.30)]+0.28$ cord according to a tenth embodiment of the invention.

FIG. 12 depicts a cord 59 according to a tenth embodiment of the invention. Elements similar to those of the eighth embodiment are denoted by identical references. Unless mentioned otherwise, only the differences compared to the eighth embodiment are described. The cord 59 according to the tenth embodiment differs from the cord 50 according to the eighth embodiment in terms of its internal strand TI.

Unlike in the eighth embodiment described hereinabove, the cord 59 according to the tenth embodiment is such that D=4.93 mm.

The diameter DI of the internal strand TI is such that DI=1.773 mm.

The mean inter-strand distance E separating two adjacent external strands TE is here E=84 μm.

Internal Strand TI of the Cord 59

Unlike in the eighth embodiment

Q=4, N=7, 8 or 9 and here Q=4 and N=9. In addition, d1=d2=0.40 mm.

The external layer C3 of the internal strand TI is desaturated and completely unsaturated. The inter-wire distance I3 of the external layer C3 which on average separates the N external wires is equal to 56.4 μm. The sum SI3 of the inter-wire distances I3 of the external layer C3 is greater than the diameter d3 of the external wires F3 of the external layer C3. Here, the sum SI3=9×0.0564=0.61 mm, which is a value strictly greater than d3=0.40 mm.

External Strands TE of the Cord 59

According to the invention, and as in the eighth embodiment, the pitches p2'=10 mm and p3'=20 mm satisfy the relationship 0.36≤(p3'−p2')/p3'≤0.57. In this instance (p3'−p2')/p3'=0.50.

The features of the various cords described hereinabove are summarized in tables C and D below.

TABLE C

| | Cord | 50 | 51 | 52 | 53 | 54 | 55 | 56 |
|---|---|---|---|---|---|---|---|---|
| TI | Q/M/N | 1/6/11 | 1/6/12 | 1/6/11 | 1/6/12 | 3/9/15 | 1/6/11 | 1/6/11 |
| | d1/d2/d3 | 0.38/0.35/0.35 | 0.38/0.35/0.35 | 0.38/0.35/0.35 | 0.40/0.40/0.40 | 0.38/0.38/0.38 | 0.38/0.35/0.35 | 0.60/0.50/0.45 |
| | direction for C1/pitch p1 (mm) | —/Inf | —/Inf | —/Inf | —/Inf | Z/6.5 | —/Inf | —/Inf |
| | direction for C2/pitch p2 (mm) | Z/14 | Z/14 | Z/14 | Z/14 | Z/12 | Z/10 | Z/14 |
| | direction for C3/pitch p3 (mm) | Z/20 | Z/20 | Z/20 | Z/20 | Z/18 | Z/20 | Z/20 |
| | (p3 − p2)/p3 | 0.30 | 0.30 | 0.30 | 0.30 | 0.33 | 0.50 | 0.30 |
| | I2 (μm)/SI2 (mm) | 11.6/0.07 | 11.6/0.07 | 11.6/0.07 | 0/0 | 14.6/0.13 | 8.2/0.05 | 39.1/0.23 |
| | I3 (μm)/SI3 (mm) | 45.0/0.50 | 12.0/0.14 | 45.0/0.50 | 4.9/0.06 | 7.0/0.11 | 45.0/0.50 | 107.2/1.18 |
| | DI (mm) | 1.78 | 1.78 | 1.78 | 2.01 | 2.34 | 1.78 | 2.5 |
| TE | Q'/M'/N' | 1/6/11 | 1/6/12 | 1/5/11 | 1/6/11 | 1/6/11 | 1/6/11 | 1/6/11 |
| | d1'/d2'/d3' | 0.38/0.30/0.30 | 0.38/0.30/0.30 | 0.35/0.35/0.30 | 0.32/0.26/0.26 | 0.45/0.38/0.38 | 0.38/0.30/0.30 | 0.45/0.38/0.38 |
| | direction for C1'/pitch p1' (mm) | inf | inf | inf | inf | inf | inf | inf |
| | direction for C2'/pitch p2' (mm) | Z/10 | Z/10 | Z/10 | Z/10 | Z/10 | Z/10 | Z/12.5 |
| | direction for C3'/pitch p3' (mm) | Z/20 | Z/20 | Z/20 | Z/20 | Z/20 | Z/20 | Z/25 |

TABLE C-continued

| Cord | 50 | 51 | 52 | 53 | 54 | 55 | 56 |
|---|---|---|---|---|---|---|---|
| (p3' − p2')/p3' | 0.50 | 0.50 | 0.50 | 0.50 | 0.50 | 0.50 | 0.50 |
| I2' (μm)/SI2' (mm) | 35.4/0.21 | 35.4/0.21 | 57.5/0.29 | 27.1/0.16 | 25.7/0.15 | 35.4/0.21 | 29.1/0.17 |
| I3' (μm)/SI3' (mm) | 55.4/0.61 | 25.7/0.31 | 74.7/0.82 | 46.6/0.51 | 57.5/0.63 | 55.4/0.61 | 61.3/0.67 |
| DE (mm) | 1.58 | 1.58 | 1.65 | 1.36 | 1.97 | 1.58 | 1.97 |
| L | 6 | 6 | 6 | 7 | 6 | 6 | 6 |
| D (mm) | 4.9 | 4.9 | 5.1 | 4.7 | 6.3 | 1.6 | 6.4 |
| E (μm) | 87.3 | 87.3 | 50.6 | 90.1 | 160.0 | 87.3 | 238.9 |
| DI/DE | 1.13 | 1.13 | 1.07 | 1.48 | 1.19 | 1.13 | 1.27 |
| Direction of winding of the cord | S | S | S | S | S | S | S |

TABLE D

| | Cord | 57 | 58 | 59 |
|---|---|---|---|---|
| T1 | Q/—/N | 2/—/7 | 3/—/8 | 4/—/9 |
| | d1/—/d3 | 0.45/—/0.45 | 0.42/—/0.42 | 0.40/—/0.40 |
| | direction for C1/pitch p1 (mm) | Z/7.7 | Z/7.7 | Z/7.7 |
| | direction for C2/pitch p2 (mm) | —/— | —/— | —/— |
| | direction for C3/pitch p3 (mm) | Z/15.4 | Z/15.4 | Z/15.4 |
| | I3 (μm)/SI3 (mm) | 124.2/0.87 | 75.8/0.61 | 56.4/0.51 |
| | DI (mm) | 1.8 | 1.75 | 1.773 |
| TE | Q'/M'/N' | 1/6/11 | 1/6/11 | 1/6/11 |
| | d1'/d2'/d3' | 0.38/0.30/0.30 | 0.38/0.30/0.30 | 0.38/0.30/0.30 |
| | direction for C1'/pitch p1' (mm) | inf | inf | inf |
| | direction for C2'/pitch p2' (mm) | Z/10 | Z/10 | Z/10 |
| | direction for C3'/pitch p3' (mm) | Z/20 | Z/20 | Z/20 |
| | (p3' − p2')/p3' | 0.50 | 0.50 | 0.50 |
| | I2' (μm)/SI2' (mm) | 35.4/0.21 | 35.4/0.21 | 35.4/0.21 |
| | I3' (μm)/SI3' (mm) | 55.4/0.61 | 55.4/0.61 | 55.4/0.61 |
| | DE (mm) | 1.58 | 1.58 | 1.58 |
| | L | 6 | 6 | 6 |
| | D (mm) | 4.96 | 4.91 | 4.93 |
| | E (μm) | 97.3 | 71.0 | 84.0 |
| | DI/DE | 1.14 | 1.14 | 1.12 |
| | Direction of winding of the cord | S | S | S |

Comparative Tests and Measurements

Cord Permeability Test

Such a permeability test is well known to those skilled in the art and makes it possible to determine the longitudinal permeability to air of the cords tested, by measuring the volume of air passing along a test specimen under constant pressure over a given period of time. The principle of such a test, which is well known to those skilled in the art, is to demonstrate the effectiveness of the treatment of a cord to make it impermeable to air; it has been described for example in standard ASTM D2692-98.

Such a test is carried out on as-manufactured and non-aged cords. The raw cords are coated on the outside beforehand with an elastomer compound referred to as coating compound. For this purpose, a series of 10 cords laid parallel (distance between cords: 20 mm) is placed between two layers or "skims" (two rectangles measuring 80×200 mm) of a diene elastomer compound in the raw state, each skim having a thickness of 5 mm; all of this is then immobilized in a mould, with each of the cords kept under sufficient tension (for example 3 daN) to guarantee that it lies straight as it is being placed in the mould, using clamping modules; it is then vulcanized (cured) for around 10 to 12 hours at a temperature of around 120° C. and at a pressure of 15 bar (rectangular piston measuring 80×200 mm). After that, the entirety is removed from the mould and 10 test specimens of cords thus coated are cut out, for characterizing, in the shape of parallelepipeds measuring 7×7×60 mm.

The compound used as a coating elastomer compound is a diene elastomer compound conventionally used in tyres, based on natural (peptized) rubber and carbon black N330 (65 phr), also containing the following usual additives: sulfur (7 phr), sulfenamide accelerator (1 phr), ZnO (8 phr), stearic acid (0.7 phr), antioxidant (1.5 phr), cobalt naphthenate (1.5 phr) (phr meaning parts by weight per hundred parts of elastomer); the E10 modulus of the coating elastomer compound is around 10 MPa.

The test is carried out on a 6 cm length of cord, which is therefore coated with its surrounding elastomer compound (or coating elastomer compound) in the cured state, in the following way: air is injected into the inlet end of the cord at a pressure of 1 bar and the volume of air at the outlet end is measured using a flow meter (calibrated for example from 0 to 500 cm$^3$/min). During the measurement, the sample of cord is immobilized in a compressed airtight seal (for example, a seal made of dense foam or of rubber) so that only the amount of air passing along the cord from one end to the other, along its longitudinal axis, is taken into account by the measurement; the airtightness of the airtight seal itself is checked beforehand using a solid elastomer-compound test specimen, that is to say one devoid of cord.

The higher the longitudinal impermeability of the cord, the lower the mean air flow rate measured (averaged over the 10 specimens). As the measurement is taken with a precision of ±0.2 cm3/min, measured values of less than or equal to 0.2 cm3/min are considered to be zero; they correspond to a cord that can be described as airtight (completely airtight) along its axis (i.e. in its longitudinal direction).

Indicator of the Penetrability of the Strands by an Elastomer Compound

The ability of a strand to be penetrated by an elastomer compound was determined in the following tests by simulating the size of the radial passage windows formed by two adjacent wires F2' of the intermediate layer C2' and by two adjacent wires F3' of the external layer C3'. Such windows are illustrated in FIG. 13 which depicts a schematic view of an external strand along its main axis P and in FIG. 14 which depicts the radial passage window S defined hereinabove.

Such an indicator of the penetrability of the strand gives an image of the impermeability of the strand to air. Specifically, the larger the size of the windows, the higher the penetrability indicator, the more the elastomer compound is liable to penetrate the strand and the more impermeable the strand is to air. The permeability could also be determined by the permeability test described hereinabove applied to the strand. Nevertheless, for the sake of the speed at which the strands can be evaluated, the inventors favoured simulation and calculation of the windows S over the permeability test.

Influence of the Directions of Winding

Table 1 below collates the results of the permeability test and of the penetrability indicator test for two control cords T1 and T2 and for the cord 50 according to the invention.

The results of these tests are indicated in base 100. Thus, a result higher than 100 for any one of these tests means that the cord or the strand tested exhibits superior impermeability or penetrability to the control cord or strand, in this instance the cord T1 or the strands of the cord T1.

It may be noted that the cord 50 according to the invention has an impermeability that is over twice that of the control cord T1, and that this is solely by virtue of the ratio (p3'−p2')/p3' of the intermediate C2' and external C3' layers of the external strand TE according to the invention.

A comparison of the control cords T1, T2 shows that the fact that the external layers C3 and C3' are wound in the same direction which is the opposite of the direction of winding of the L external strands TE (cord T1) is an essential feature of the invention that makes it possible to ensure good impermeability of the cord.

Evaluation of the Penetrability Indicator for the External Strands According to the Pitch p3' of the Cord 50

Various external strands analogous to the external strand of the cord 50 according to the invention were simulated by varying the value of p2' for various values of p3', with all the other structural features of the cord remaining unchanged in comparison with the above description.

The results of these simulations are collated in the various Tables 2 to 6 in base 100 with respect, in each instance, to a control strand such that (p3'−p2')/p3'=0.30. Thus, for a window size value St for the tested strand and for a window size value S0 for the control strand, the penetrability indicator is equal to St*100/S0. Thus, a result higher than 100 means that the strand tested exhibits superior penetrability to the corresponding control strand. It is estimated that the size of the windows is significantly higher when the penetrability indicator is greater than or equal to 120, which means to say when the size of the windows in the strand tested is 20% higher than that of the control strand.

Each Table 2 to 6 respectively corresponds to a pitch p3' equal to 15, 17, 20, 23, 25 mm.

It will be noted that, although the inter-wire distance I2' increases when p2' increases, the maximum value for the radial passage windows is obtained for I2' values which are not necessarily the highest values. Thus, before carrying out the invention, a person skilled in the art, starting from the assumption that the lower I2', the lower the penetrability of the strand, would have difficulty in predicting a maximum penetrability for p2' values that yield relatively low values for I2'.

Within the interval for the ratio (p3'−p2')/p3' that ranges from 0.36 to 0.57, and for each p3' value tested, the value for the penetrability indicator is significantly higher than that obtained for the corresponding control strand.

TABLE 1

|    | Cord | T1 | T2 | 50 |
|----|------|----|----|----|
| TI | Q/M/N | 1/6/11 | 1/6/11 | 1/6/11 |
|    | d1/d2/d3 | 0.38/0.35/0.35 | 0.38/0.35/0.35 | 0.38/0.35/0.35 |
|    | direction for C1/pitch p1 (mm) | —/Inf | —/Inf | —/Inf |
|    | direction for C2/pitch p2 (mm) | Z/14 | S/14 | Z/14 |
|    | direction for C3/pitch p3 (mm) | Z/20 | S/20 | Z/20 |
| TE | Q'/M'/N' | 1/6/11 | 1/6/11 | 1/6/11 |
|    | d1'/d2'/d3' | 0.38/0.30/0.30 | 0.38/0.30/0.30 | 0.38/0.30/0.30 |
|    | direction for C1'/pitch p1' (mm) | inf | inf | inf |
|    | direction for C2'/pitch p2' (mm) | Z/14 | Z/14 | Z/10 |
|    | direction tor C3'/pitch p3' (mm) | Z/20 | Z/20 | Z/20 |
|    | (p3' − p2')/p3' | 0.30 | 0.30 | 0.50 |
|    | Direction of winding of the cord | S | S | S |
| Penetrability indicator for the external strand (base 100 T1) | | 100 | 100 | 360 |
| Impermeability (base 100 T1) | | 100 | <10 | 210 |

TABLE 2

External strands of the cord 50 which were tested with p3' = 15 mm

| direction for C1'/pitch p1' (mm) | —/inf | —/inf | —/inf | —/inf | —/inf | —/inf | —/inf | —/inf | —/inf | —/inf | —/inf | —/inf | —/inf | —/inf |
|---|---|---|---|---|---|---|---|---|---|---|---|---|---|---|
| direction for C2'/pitch p2' (mm) | Z/12 | Z/11.5 | Z/11.0 | Z/10.5 | Z/10.0 | Z/9.6 | Z/9.5 | Z/9.0 | Z/8.5 | Z/8.0 | Z/7.5 | Z/7.0 | Z/6.5 | Z/6.0 |
| direction for C3'/pitch p3' (mm) | Z/15 | Z/15 | Z/15 | Z/15 | Z/15 | Z/15 | Z/15 | Z/15 | Z/15 | Z/15 | Z/15 | Z/15 | Z/15 | Z/15 |
| (p3' − p2')/p3' | 0.20 | 0.23 | 0.27 | 0.30 | 0.33 | 0.36 | 0.37 | 0.40 | 0.43 | 0.47 | 0.50 | 0.53 | 0.57 | 0.60 |
| I2' (μm) | 37 | 36.7 | 36.3 | 35.9 | 35.4 | 34.8 | 34.8 | 34.2 | 33.4 | 32.5 | 31.4 | 30.1 | 28.4 | 26.3 |
| Penetrability indicator for the external strand | 74 | 80 | 89 | 100 | 109 | 140 | 145 | 200 | 359 | 5590 | 337 | 146 | 125 | 54 |

TABLE 3

External strands of the cord 50 which were tested with p3' = 17 mm

| direction for C1'/pitch p1' (mm) | —/inf | —/inf | —/inf | —/inf | —/inf | —/inf | —/inf | —/inf | —/inf | —/inf | —/inf | —/inf |
|---|---|---|---|---|---|---|---|---|---|---|---|---|
| direction for C2'/pitch p2' (mm) | Z/14.0 | Z/13.0 | Z/12.5 | Z/12.0 | Z/11.9 | Z/11.5 | Z/11.0 | Z/10.8 | Z/10.0 | Z/9.0 | Z/8.0 | Z/7.3 | Z/6.5 |
| direction for C3'/pitch p3' (mm) | Z/17 | Z/17 | Z/17 | Z/17 | Z/17 | Z/17 | Z/17 | Z/17 | Z/17 | Z/17 | Z/17 | Z/17 | Z/17 |
| (p3' − p2')/p3' | 0.18 | 0.24 | 0.26 | 0.29 | 0.30 | 0.32 | 0.35 | 0.36 | 0.41 | 0.47 | 0.53 | 0.57 | 0.62 |
| I2' (μm) | 38.0 | 37.5 | 37.3 | 37 | 36.9 | 36.7 | 36.3 | 36.1 | 35.4 | 34.2 | 32.5 | 30.9 | 28.4 |
| Penetrability indicator for the external strand | 70 | 80 | 88 | 98 | 100 | 108 | 111 | 144 | 239 | 6261 | 165 | 123 | 68 |

TABLE 4

External strands of the cord 50 which were tested with p3' = 20 mm

| direction for C1'/pitch p1' (mm) | —/inf | —/inf | —/inf | —/inf | —/inf | —/inf | —/inf | —/inf |
|---|---|---|---|---|---|---|---|---|
| direction for C2'/pitch p2' (mm) | Z/16.0 | Z/14.0 | Z/13.0 | Z/12.8 | Z/12.5 | Z/12.0 | Z/11.5 | Z/11.0 |
| direction for C3'/pitch p3' (mm) | Z/20 | Z/20 | Z/20 | Z/20 | Z/20 | Z/20 | Z/20 | Z/20 |
| (p3' − p2')/p3' | 0.20 | 0.30 | 0.35 | 0.36 | 0.38 | 0.40 | 0.43 | 0.45 |
| I2' (μm) | 38.6 | 38 | 37.5 | 37.2 | 37 | 36.8 | 36.7 | 36.3 |
| Penetrability indicator for the external strand | 73 | 100 | 108 | 135 | 158 | 205 | 306 | 676 |

External strands of the cord 50 which were tested with p3' = 20 mm

| direction for C1'/pitch p1' (mm) | —/inf | —/inf | —/inf | —/inf | —/inf | —/inf | —/inf |
|---|---|---|---|---|---|---|---|
| direction for C2'/pitch p2' (mm) | Z/10.5 | Z/10.0 | Z/9.5 | Z/9.0 | Z/8.6 | Z/8.0 | Z/7.0 |
| direction for C3'/pitch p3' (mm) | Z/20 | Z/20 | Z/20 | Z/20 | Z/20 | Z/20 | Z/20 |
| (p3' − p2')/p3' | 0.48 | 0.50 | 0.53 | 0.55 | 0.57 | 0.60 | 0.65 |
| I2' (μm) | 35.9 | 35.4 | 34.8 | 34.2 | 33.4 | 32.5 | 30.1 |
| Penetrability indicator for the external strand | 1914 | 360 | 187 | 129 | 122 | 69 | 37 |

TABLE 5

| External strands of the cord 50 which were tested with p3' = 23 mm | | | | | | | | |
|---|---|---|---|---|---|---|---|---|
| direction for C1'/pitch p1' (mm) | —/inf | —/inf | —/inf | —/inf | —/inf | —/inf | —/inf | —/inf |
| direction for C2'/pitch p2' (mm) | Z/19.0 | Z/17.0 | Z/16.1 | Z/15.0 | Z/14.7 | Z/14.0 | Z/13.0 | Z/12.5 |
| direction for C3'/pitch p3' (mm) | Z/23 | Z/23 | Z/23 | Z/23 | Z/23 | Z/23 | Z/23 | Z/23 |
| (p3' − p2')/p3' | 0.17 | 0.26 | 0.30 | 0.35 | 0.36 | 0.39 | 0.43 | 0.46 |
| I2' (μm) | 39.2 | 38.8 | 38.6 | 38.3 | 38.2 | 38 | 37.5 | 37.3 |
| Penetrability indicator for the external strand | 69 | 86 | 100 | 107 | 141 | 186 | 390 | 1034 |

| External strands of the cord 50 which were tested with p3' = 23 mm | | | | | | | |
|---|---|---|---|---|---|---|---|
| direction for C1'/pitch p1' (mm) | —/inf | —/inf | —/inf | —/inf | —/inf | —/inf | —/inf |
| direction for C2'/pitch p2' (mm) | Z/12.0 | Z/11.5 | Z/11.0 | Z/10.0 | Z/9.0 | Z/8.0 | Z/7.0 |
| direction for C3'/pitch p3' (mm) | Z/23 | Z/23 | Z/23 | Z/23 | Z/23 | Z/23 | Z/23 |
| (p3' − p2')/p3' | 0.48 | 0.50 | 0.52 | 0.57 | 0.61 | 0.65 | 0.70 |
| I2' (μm) | 37 | 36.7 | 36.3 | 35.4 | 34.2 | 32.5 | 30.1 |
| Penetrability indicator for the external strand | 1267 | 366 | 205 | 125 | 70 | 38 | 25 |

TABLE 6

| External strands of the cord 50 which were tested with p3' = 25 mm | | | | | | | | |
|---|---|---|---|---|---|---|---|---|
| direction for C1'/pitch p1' (mm) | —/inf | —/inf | —/inf | —/inf | —/inf | —/inf | —/inf | —/inf |
| direction for C2'/pitch p2' (mm) | Z/18.0 | Z/17.5 | Z/17.0 | Z/16.5 | Z/16.0 | Z/15.0 | Z/14.0 | Z/13.0 |
| direction for C3'/pitch p3' (mm) | Z/25 | Z/25 | Z/25 | Z/25 | Z/25 | Z/25 | Z/25 | Z/25 |
| (p3' − p2')/p3' | 0.28 | 0.30 | 0.32 | 0.34 | 0.36 | 0.40 | 0.44 | 0.48 |
| I2' (μm) | 39 | 38.9 | 38.8 | 38.7 | 38.6 | 38.3 | 38 | 37.5 |
| Penetrability indicator for the external strand | 92 | 100 | 109 | 108 | 140 | 206 | 456 | 1069 |

| External strands of the cord 50 which were tested with p3' = 25 mm | | | | | | |
|---|---|---|---|---|---|---|
| direction for C1'/pitch p1' (mm) | —/inf | —/inf | —/inf | —/inf | —/inf | —/inf |
| direction for C2'/pitch p2' (mm) | Z/12.0 | Z/11.5 | Z/11.0 | Z/10.8 | Z/10.5 | Z/10.0 |
| direction for C3'/pitch p3' (mm) | Z/25 | Z/25 | Z/25 | Z/25 | Z/25 | Z/25 |
| (p3' − p2')/p3' | 0.52 | 0.54 | 0.56 | 0.57 | 0.58 | 0.60 |
| I2' (μm) | 37 | 36.7 | 36.7 | 36.1 | 35.9 | 35.4 |
| Penetrability indicator for the external strand | 213 | 166 | 148 | 127 | 93 | 66 |

Evaluation of the Penetrability Indicator for the External Strands of the Cords 51 to 59

In a way similar to the cord 50 according to the first embodiment of the invention, various external strands of the cords 51 to 59 according to the various embodiments of the invention were simulated by varying the value of p2' while fixing the value of p3' to the value described hereinabove, with all the other structural features of each cord remaining unchanged in comparison with the above description.

The results of these simulations are collated in the various Tables 7 to 12 in base 100 with respect, in each instance, to a control strand such that (p3'−p2')/p3'=0.30. Thus, for a window size value St for the tested strand and for a window size value S0 for the control strand, the penetrability indicator is equal to St*100/S0. Thus, a result higher than 100 means that the strand tested exhibits superior penetrability to the corresponding control strand. It is estimated that the size of the windows is significantly higher when the penetrability indicator is greater than or equal to 120, which means to say when the size of the windows in the strand tested is 20% higher than that of the control strand.

It will be noted that, although the inter-wire distance I2' increases when p2' increases, the maximum value for the size of the radial passage windows is obtained for I2' values which are not necessarily the highest values. Thus, before carrying out the invention, a person skilled in the art, starting from the assumption that the lower I2', the lower the penetrability of the strand, would have difficulty in predicting a maximum penetrability for p2' values that yield relatively low values for I2'.

Within the interval for the ratio (p3'−p2')/p3' that ranges from 0.36 to 0.57, and for each p3' value tested, the value for the penetrability indicator is significantly higher than that obtained for the corresponding control strand.

TABLE 7

| External strands of the cord 51 | | | | | | | | |
|---|---|---|---|---|---|---|---|---|
| direction for C1'/pitch p1' (mm) | —/inf | —/inf | —/inf | —/inf | —/inf | —/inf | —/inf | —/inf |
| direction for C2'/pitch p2' (mm) | Z/16.0 | Z/14.0 | Z/13.0 | Z/12.8 | Z/12.5 | Z/12.0 | Z/11.5 | Z/11.0 |
| direction for C3'/pitch p3' (mm) | Z/20 | Z/20 | Z/20 | Z/20 | Z/20 | Z/20 | Z/20 | Z/20 |
| (p3' − p2')/p3' | 0.20 | 0.30 | 0.35 | 0.36 | 0.38 | 0.40 | 0.43 | 0.45 |
| I2' (μm) | 38.6 | 38 | 37.5 | 37.4 | 37.3 | 37 | 36.7 | 36.3 |
| Penetrability indicator for the external strand | 73 | 100 | 108 | 135 | 158 | 205 | 306 | 676 |

| External strands of the cord 51 | | | | | | | |
|---|---|---|---|---|---|---|---|
| direction for C1'/pitch p1' (mm) | —/inf | —/inf | —/inf | —/inf | —/inf | —/inf | —/inf |
| direction for C2'/pitch p2' (mm) | Z/10.5 | Z/10.0 | Z/9.5 | Z/9.0 | Z/8.6 | Z/8.0 | Z/7.0 |
| direction for C3'/pitch p3' (mm) | Z/20 | Z/20 | Z/20 | Z/20 | Z/20 | Z/20 | Z/20 |
| (p3' − p2')/p3' | 0.48 | 0.50 | 0.53 | 0.55 | 0.57 | 0.60 | 0.65 |
| I2' (μm) | 35.9 | 35.4 | 34.8 | 34.2 | 33.4 | 32.5 | 30.1 |
| Penetrability indicator for the external strand | 1914 | 360 | 187 | 129 | 122 | 69 | 37 |

TABLE 8

| External strands of the cord 52 | | | | | | | | |
|---|---|---|---|---|---|---|---|---|
| direction for C1'/pitch p1' (mm) | —/inf | —/inf | —/inf | —/inf | —/inf | —/inf | —/inf | —/inf |
| direction for C2'/pitch p2' (mm) | Z/16.0 | Z/14.0 | Z/13.0 | Z/12.8 | Z/12.5 | Z/12.0 | Z/11.5 | Z/11.0 |
| direction for C3'/pitch p3' (mm) | Z/20 | Z/20 | Z/20 | Z/20 | Z/20 | Z/20 | Z/20 | Z/20 |
| (p3' − p2')/p3' | 0.20 | 0.30 | 0.35 | 0.36 | 0.38 | 0.40 | 0.43 | 0.45 |
| I2' (μm) | 61.1 | 60.4 | 59.9 | 59.8 | 59.6 | 59.3 | 58.9 | 58.5 |
| Penetrability indicator for the external strand | 75 | 100 | 108 | 135 | 150 | 188 | 258 | 439 |

| External strands of the cord 52 | | | | | | | |
|---|---|---|---|---|---|---|---|
| direction for C1'/pitch p1' (mm) | —/inf | —/inf | —/inf | —/inf | —/inf | —/inf | —/inf |
| direction for C2'/pitch p2' (mm) | Z/10.5 | Z/10.0 | Z/9.5 | Z/9.0 | Z/8.6 | Z/8.0 | Z/7.0 |
| direction for C3'/pitch p3' (mm) | Z/20 | Z/20 | Z/20 | Z/20 | Z/20 | Z/20 | Z/20 |
| (p3' − p2')/p3' | 0.48 | 0.50 | 0.53 | 0.55 | 0.57 | 0.60 | 0.65 |
| I2' (μm) | 58 | 57.5 | 56.9 | 56.2 | 55.5 | 54.3 | 51.6 |
| Penetrability indicator for the external strand | 2020 | 667 | 267 | 158 | 126 | 79 | 48 |

TABLE 9

| External strands of the cord 53 | | | | | | | |
|---|---|---|---|---|---|---|---|
| direction for C1'/pitch p1' (mm) | —/inf | —/inf | —/inf | —/inf | —/inf | —/inf | —/inf |
| direction for C2'/pitch p2' (mm) | Z/15.0 | Z/14.0 | Z/13.0 | Z/12.8 | Z/12.5 | Z/12.0 | Z/11.5 | Z/11.0 |
| direction for C3'/pitch p3' (mm) | Z/20 | Z/20 | Z/20 | Z/20 | Z/20 | Z/20 | Z/20 |
| (p3' − p2')/p3' | 0.25 | 0.30 | 0.35 | 0.36 | 0.38 | 0.40 | 0.43 | 0.45 |
| I2' (μm) | 29 | 28.8 | 28.5 | 28.4 | 28.3 | 28.1 | 27.9 | 27.7 |
| Penetrability indicator for the external strand | 84 | 100 | 109 | 138 | 155 | 199 | 189 | 575 |

TABLE 9-continued

| External strands of the cord 53 | | | | | | | |
|---|---|---|---|---|---|---|---|
| direction for C1'/pitch p1' (mm) | —/inf | —/inf | —/inf | —/inf | —/inf | —/inf | —/inf |
| direction for C2'/pitch p2' (mm) | Z/10.5 | Z/10.0 | Z/9.5 | Z/9.0 | Z/8.6 | Z/8.0 | Z/7.0 |
| direction for C3'/pitch p3' (mm) | Z/20 | Z/20 | Z/20 | Z/20 | Z/20 | Z/20 | Z/20 |
| (p3' − p2')/p3' | 0.48 | 0.50 | 0.53 | 0.55 | 0.57 | 0.60 | 0.65 |
| I2' (μm) | 27.4 | 27.1 | 26.8 | 26.4 | 26 | 25.3 | 23.7 |
| Penetrability indicator for the external strand | 5438 | 427 | 209 | 142 | 123 | 85 | 40 |

TABLE 10

| External strands of the cord 54 | | | | | | | |
|---|---|---|---|---|---|---|---|
| direction for C1'/pitch p1' (mm) | —/inf | —/inf | —/inf | —/inf | —/inf | —/inf | —/inf |
| direction for C2'/pitch p2' (mm) | Z/15.0 | Z/14.0 | Z/13.0 | Z/12.8 | Z/12.5 | Z/12.0 | Z/11.5 | Z/11.0 |
| direction for C3'/pitch p3' (mm) | Z/20 | Z/20 | Z/20 | Z/20 | Z/20 | Z/20 | Z/20 | Z/20 |
| (p3' − p2')/p3' | 0.25 | 0.30 | 0.35 | 0.36 | 0.38 | 0.40 | 0.43 | 0.45 |
| I2' (μm) | 31.1 | 30.4 | 29.6 | 29.4 | 29.1 | 28.6 | 28 | 27.3 |
| Penetrability indicator for the external strand | 85 | 100 | 107 | 133 | 148 | 185 | 254 | 449 |

| External strands of the cord 54 | | | | | | | |
|---|---|---|---|---|---|---|---|
| direction for C1'/pitch p1' (mm) | —/inf | —/inf | —/inf | —/inf | —/inf | —/inf | —/inf |
| direction for C2'/pitch p2' (mm) | Z/10.5 | Z/10.0 | Z/9.5 | Z/9.0 | Z/8.6 | Z/8.0 | Z/7.0 |
| direction for C3'/pitch p3' (mm) | Z/20 | Z/20 | Z/20 | Z/20 | Z/20 | Z/20 | Z/20 |
| (p3' − p2')/p3' | 0.48 | 0.50 | 0.53 | 0.55 | 0.57 | 0.60 | 0.65 |
| I2' (μm) | 26.6 | 25.7 | 24.6 | 23.4 | 22.3 | 20.3 | 15.8 |
| Penetrability indicator for the external strand | 3901 | 487 | 208 | 152 | 127 | 76 | 40 |

TABLE 11

| External strands of the cords 55, 57, 58, 59 | | | | | | | |
|---|---|---|---|---|---|---|---|
| direction for C1'/pitch p1' (mm) | —/inf | —/inf | —/inf | —/inf | —/inf | —/inf | —/inf | —/inf |
| direction for C2'/pitch p2' (mm) | Z/16.0 | Z/14.0 | Z/13.0 | Z/12.8 | Z/12.5 | Z/12.0 | Z/11.5 | Z/11.0 |
| direction for C3'/pitch p3' (mm) | Z/20 | Z/20 | Z/20 | Z/20 | Z/20 | Z/20 | Z/20 | Z/20 |
| (p3' − p2')/p3' | 0.20 | 0.30 | 0.35 | 0.36 | 0.38 | 0.40 | 0.43 | 0.45 |
| I2' (μm) | 38.6 | 38 | 37.5 | 37.2 | 37 | 36.8 | 36.7 | 36.3 |
| Penetrability indicator for the external strand | 73 | 100 | 108 | 135 | 158 | 205 | 306 | 676 |

| External strands of the cords 55, 57, 58, 59 | | | | | | | |
|---|---|---|---|---|---|---|---|
| direction for C1'/pitch p1' (mm) | —/inf | —/inf | —/inf | —/inf | —/inf | —/inf | —/inf |
| direction for C2'/pitch p2' (mm) | Z/10.5 | Z/10.0 | Z/9.5 | Z/9.0 | Z/8.6 | Z/8.0 | Z/7.0 |
| direction for C3'/pitch p3' (mm) | Z/20 | Z/20 | Z/20 | Z/20 | Z/20 | Z/20 | Z/20 |
| (p3' − p2')/p3' | 0.48 | 0.50 | 0.53 | 0.55 | 0.57 | 0.60 | 0.65 |
| I2' (μm) | 35.9 | 35.4 | 34.8 | 34.2 | 33.4 | 32.5 | 30.1 |
| Penetrability indicator for the external strand | 1914 | 360 | 187 | 129 | 122 | 69 | 37 |

TABLE 12

External strands of the cord 56

| | | | | | | | | |
|---|---|---|---|---|---|---|---|---|
| direction for C1'/pitch p1' (mm) | —/inf | —/inf | —/inf | —/inf | —/inf | —/inf | —/inf | —/inf |
| direction for C2'/pitch p2' (mm) | Z/20.0 | Z/18.0 | Z/17.5 | Z/17.0 | Z/16.5 | Z/16.0 | Z/15.0 | Z/14.0 |
| direction for C3'/pitch p3' (mm) | Z/25 | Z/25 | Z/25 | Z/25 | Z/25 | Z/25 | Z/25 | Z/25 |
| (p3' − p2')/p3' | 0.20 | 0.28 | 0.30 | 0.32 | 0.34 | 0.36 | 0.40 | 0.44 |
| I2' (μm) | 33 | 32.4 | 32.2 | 32 | 31.8 | 31.6 | 31.1 | 30.4 |
| Penetrability indicator for the external strand | 75 | 93 | 100 | 109 | 114 | 135 | 189 | 354 |

External strands of the cord 56

| | | | | | | | |
|---|---|---|---|---|---|---|---|
| direction for C1'/pitch p1' (mm) | —/inf | —/inf | —/inf | —/inf | —/inf | —/inf | —/inf |
| direction for C2'/pitch p2' (mm) | Z/13.0 | Z/12.0 | Z/11.5 | Z/11.0 | Z/10.8 | Z/10.0 | Z/9.0 |
| direction for C3'/pitch p3' (mm) | Z/25 | Z/25 | Z/25 | Z/25 | Z/25 | Z/25 | Z/25 |
| (p3' − p2')/p3' | 0.48 | 0.52 | 0.54 | 0.56 | 0.57 | 0.60 | 0.64 |
| I2' (μm) | 29.6 | 28.6 | 28 | 27.3 | 27 | 25.7 | 23.4 |
| Penetrability indicator for the external strand | 6039 | 258 | 164 | 125 | 123 | 66 | 41 |

Tables 7 to 12 show that, for varying cord constructions, the penetration of the elastomer compound into the external strands, and therefore the ability this elastomer compound has to access the internal strand, is significantly improved for a ratio (p3'−p2')/p3' ranging from 0.36 to 0.57 by comparison with the control cords for which (p3'−p2')/p3'=0.30.

Of course, the invention is not restricted to the exemplary embodiments described above.

For reasons of industrial feasibility, of cost and of overall performance, it is preferable to implement the invention with linear wires, that is to say straight wires, having a conventional circular crosssection.

It will also be possible to combine the features of the various embodiments described or envisaged above, with the proviso that these features are compatible with one another.

In one embodiment not described hereinabove, in the case where L=8, DI/DE≥1.60, for preference DI/DE≥1.65 and more preferably DI/DE≥1.70 and DI/DE≤2.0, for preference DI/DE≤1.95 and more preferably DI/DE≤1.90.

In another embodiment not described hereinabove, in the case where L=9, DI/DE≥2.00, for preference DI/DE≥2.05 and more preferably DI/DE≥2.10 and DI/DE≤2.50, for preference DI/DE≤2.45 and more preferably DI/DE≤2.40.

In a first embodiment not described hereinabove, in the case where the internal strand TI has two layers, or three layers, the intermediate layer of each external strand is wound around the internal layer of each external strand in a direction of winding identical to the direction of winding of the cord.

In a first alternative of this first embodiment, in which Q>1, the internal layer of the internal strand is wound in a helix with a direction of winding identical to the direction of winding of the cord. In a second alternative of this first embodiment, in which Q>1, the internal layer of the internal strand is wound in a helix with a direction of winding opposite to the direction of winding of the cord.

In a second embodiment of the cord not described hereinabove, in the case where the internal strand TI has two layers, or three layers, the intermediate layer of each external strand is wound around the internal layer of each external strand in a direction of winding opposite to the direction of winding of the cord. In a first alternative of this second embodiment, in which Q>1, the internal layer of the internal strand is wound in a helix with a direction of winding identical to the direction of winding of the cord.

The directions of winding of the embodiments and alternatives envisaged hereinabove may just as well be S as Z.

The invention claimed is:

1. A two-layer multi-strand cord comprising:
    an internal layer made up of an internal strand having at least two layers comprising:
        an internal layer made up of Q internal wires; and
        an external layer made up of N external wires wound around the internal layer; and
    an external layer made up of L>1 external strands having three layers comprising:
        an internal layer made up of Q'=1 internal wire;
        an intermediate layer made up of M' intermediate wires wound around the internal layer with a pitch p2'; and
        an external layer made up of N' external wires wound around the intermediate layer with a pitch p3',
    wherein the external layer of the cord is wound around the internal layer of the cord in a direction of winding of the cord,
    wherein the external layer of the internal strand is wound around the internal layer of the internal strand in a same direction of winding as the external layer of the external strand is wound around the intermediate layer of the external strand, the direction of winding of the external layer of the internal strand around the internal layer of the internal strand and the direction of winding of the external layer of the external strand around the intermediate layer of the external strand being opposite of the direction of winding of the cord;
    wherein the external layer of the cord is desaturated, and
    wherein the pitches p2' and p3' satisfy the relationship:

$$0.36 \leq (p3'-p2')/p3' \leq 0.57.$$

2. The cord according to claim 1, wherein 0.38≤(p3'−p2')/p3', and wherein (p3'−p2')/p3'≤0.55.

3. The cord according to claim 1, wherein pitch p2' is such that 8 mm≤p2'≤16 mm.

4. The cord according to claim 1, wherein pitch p3' is such that 10 mm≤p3'≤40 mm.

5. The cord according to claim 1, wherein the internal strand has a diameter DI and each external strand has a diameter DE such that:
when L=6, DI/DE>1 and DI/DE≤1.40,
when L=7, DI/DE≥1.30 and DI/DE≤1.70,
when L=8, DI/DE≥1.60 and DI/DE≤2.0, and
when L=9, DI/DE≥2.00 and DI/DE≤2.50.

6. The cord according to claim 1, wherein a sum SI2' of inter-wire distances of the intermediate layer of each external strand is such that SI2'<d3', where d3' is the diameter of each external wire of each external strand.

7. The cord according to claim 1, wherein the intermediate layer of each external strand is desaturated.

8. The cord according to claim 1, wherein the external layer of each external strand is desaturated.

9. The cord according to claim 1, wherein L is equal to 6, 7, 8, 9 or 10.

10. The cord according to claim 1, wherein the internal wire of each external strand has a diameter d1' greater than or equal to a diameter d3' of each external wire of each external strand.

11. The cord according to claim 1, wherein the internal wire of each external strand has a diameter d1' greater than or equal to a diameter d2' of each intermediate wire of each external strand.

12. The cord according to claim 1, wherein Q'=1, M'=6, N'=11,
the internal wire of each external strand has a diameter d1' greater than a diameter d2' of each intermediate wire of the external strand, and
the internal wire of each external strand has a diameter d1' greater than a diameter d3' of each external wire of the external strand.

13. The cord according to claim 1, wherein, with each intermediate wire of each external strand having a diameter d2', and each external wire of each external strand having a diameter d3', d2'=d3'.

14. The cord according to claim 1, wherein the external layer of the internal strand is desaturated.

15. The cord according to claim 1, wherein each internal wire of the internal strand has a diameter d1 greater than or equal to a diameter d1' of each internal wire of each external strand.

16. The cord according to claim 1, wherein each internal wire of the internal strand has a diameter d1 greater than or equal to a diameter d2' of each intermediate wire of each external strand.

17. The cord according to claim 1, wherein each internal wire of the internal strand has a diameter d1 greater than or equal to a diameter d3' of each external wire of each external strand.

18. The cord according to claim 1, wherein each external wire of the internal strand has a diameter d3 greater than or equal to a diameter d3' of each external wire of each external strand.

19. A tire comprising at least one cord according to claim 1.

20. The tire according to claim 19 further comprising a carcass reinforcement anchored in two beads and surmounted radially by a crown reinforcement, which is surmounted by a tread, the crown reinforcement being joined to the beads by two sidewalls.

* * * * *